United States Patent
Kitchens, II et al.

(10) Patent No.: US 9,946,914 B1
(45) Date of Patent: Apr. 17, 2018

(54) LIVENESS DETECTION VIA ULTRASONIC RIDGE-VALLEY TOMOGRAPHY

(71) Applicant: QUALCOMM Incorporated, San Diego, CA (US)

(72) Inventors: Jack Conway Kitchens, II, Town of Tonawanda, NY (US); John Keith Schneider, Williamsville, NY (US); Kostadin Dimitrov Djordjev, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/356,424

(22) Filed: Nov. 18, 2016

(51) Int. Cl.
*G06K 9/00* (2006.01)

(52) U.S. Cl.
CPC ......... *G06K 9/0002* (2013.01); *G06K 9/0008* (2013.01)

(58) Field of Classification Search
CPC ............. G06K 9/0002; G06K 9/00019; G06K 9/00013; G06K 9/00026; G06K 9/00084; G06K 9/00065; A61B 5/1172; G06F 3/0436; G06F 3/0416; H04R 17/005
See application file for complete search history.

(56) References Cited

U.S. PATENT DOCUMENTS

| | | | |
|---|---|---|---|
| 5,224,174 A * | 6/1993 | Schneider ........... | G01S 7/52061 382/124 |
| 7,505,613 B2 | 3/2009 | Russo | |
| 7,577,276 B2 | 8/2009 | Ando | |
| 8,275,178 B2 | 9/2012 | Boshra | |
| 9,396,382 B2 | 7/2016 | Troy et al. | |
| 9,424,456 B1 * | 8/2016 | Kamath Koteshwara ......... | G06K 9/0002 |
| 2014/0270413 A1 * | 9/2014 | Slaby ................... | G06F 3/0488 382/124 |
| 2014/0354596 A1 * | 12/2014 | Djordjev ............. | G06K 9/0002 345/175 |
| 2014/0355387 A1 * | 12/2014 | Kitchens, II ......... | H04R 17/005 367/137 |
| 2015/0363630 A1 | 12/2015 | Hogan | |
| 2016/0019408 A1 * | 1/2016 | Liu ...................... | G06K 9/0002 382/124 |
| 2016/0070967 A1 * | 3/2016 | Du ...................... | G06K 9/00093 382/124 |
| 2016/0379038 A1 * | 12/2016 | Vural .................. | G06K 9/0008 382/125 |
| 2017/0255338 A1 * | 9/2017 | Medina ................ | G06F 3/0416 |
| 2017/0351850 A1 * | 12/2017 | Jin ......................... | G06F 21/32 |

* cited by examiner

*Primary Examiner* — Amir Alavi
(74) *Attorney, Agent, or Firm* — Weaver Austin Villeneuve & Sampson LLP

(57) ABSTRACT

An apparatus may include an ultrasonic sensor system and a control system. The control system may be configured for controlling the ultrasonic sensor system to obtain first ultrasonic data from at least a part of a target object proximate a surface of the apparatus. The control system may be configured for receiving the first ultrasonic data from the ultrasonic sensor system and for identifying one or more fingerprint ridge features and one or more fingerprint valley features corresponding to the first ultrasonic data. The control system may be configured for determining, based on the first ultrasonic data, one or more fingerprint valley time intervals corresponding to a depth of one or more fingerprint valley features and for performing a spoof detection process based, at least in part, on the one or more fingerprint valley time intervals.

20 Claims, 16 Drawing Sheets

LIVENESS DETECTION VIA ULTRASONIC RIDGE-VALLEY TOMOGRAPHY

TECHNICAL FIELD

This disclosure relates generally to ultrasonic sensor systems and methods for using such systems.

DESCRIPTION OF THE RELATED TECHNOLOGY

Technically savvy hackers revel in defeating the latest technical security innovations. For example, premium-tier mobile phone manufacturers have had their first smartphones that incorporated fingerprint-based authentication systems successfully hacked shortly after product introduction. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor system and a control system that is configured for communication with the ultrasonic sensor system. In some examples, at least a portion of the control system may be coupled to the ultrasonic sensor system. In some implementations, a mobile device may be, or may include, the apparatus. For example, a mobile device may include an apparatus as disclosed herein. According to some such examples, the mobile device may be a smart phone.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for controlling the ultrasonic sensor system to obtain first ultrasonic data from at least a part of a target object proximate a surface of the apparatus. The control system may be configured for receiving the first ultrasonic data from the ultrasonic sensor system.

In some examples, the control system may be configured for identifying one or more fingerprint ridge features and one or more fingerprint valley features corresponding to the first ultrasonic data. The control system may be configured for determining, based on the first ultrasonic data, one or more fingerprint valley time intervals corresponding to a depth of one or more fingerprint valley features. According to some implementations, the control system may be configured for performing a spoof detection process based, at least in part, on the one or more fingerprint valley time intervals.

According to some examples, the fingerprint valley time intervals may be ridge-to-valley time intervals measured from a crest of a fingerprint ridge feature to a trough of an adjacent fingerprint valley feature. In some examples, the control system may be configured for converting the fingerprint valley time intervals to fingerprint valley depths. The spoof detection process may involve comparing the fingerprint valley depths with a range of expected fingerprint valley depths.

According to some implementations, controlling the ultrasonic sensor system to obtain the first ultrasonic data may involve controlling the ultrasonic sensor system to obtain the first ultrasonic data during a first acquisition time window after a first acquisition time delay. In some examples, the control system may be configured for controlling the ultrasonic sensor system to obtain second ultrasonic data from at least the part of the target object during a second acquisition time window. The second acquisition time window may, in some examples, be after a second acquisition time delay that is longer than the first acquisition time delay. According to some implementations, the second acquisition time delay may correspond to a depth below a typical ridge-to-valley depth of a fingerprint. In some examples, the control system may be configured for receiving, from the ultrasonic sensor system, the second ultrasonic data and for performing the spoof detection process based, at least in part, on the second ultrasonic data.

In some examples, the control system may be configured for controlling the ultrasonic sensor system to obtain second through Nth ultrasonic data during second through Nth acquisition time windows after second through Nth acquisition time delays. According to some such examples, the control system may be configured for receiving the second through Nth ultrasonic data from the ultrasonic sensor system and for constructing a three-dimensional representation of fingerprint ridges and fingerprint valleys based on the first through Nth ultrasonic data.

According to some implementations, the ultrasonic sensor system may include an ultrasonic receiver array. In some such implementations, receiving the first ultrasonic data from the ultrasonic sensor system may involve receiving the first ultrasonic data from a single row or column of the ultrasonic receiver array.

Still other innovative aspects of the subject matter described in this disclosure can be implemented in a method. The method may involve controlling an ultrasonic sensor system to obtain first ultrasonic data from at least a part of a target object proximate a surface of an apparatus and receiving the first ultrasonic data from the ultrasonic sensor system. The method may involve identifying one or more fingerprint ridge features and one or more fingerprint valley features corresponding to the first ultrasonic data. In some examples, the method may involve determining, based on the first ultrasonic data, one or more fingerprint valley time intervals corresponding to a depth of one or more fingerprint valley features and performing a spoof detection process based, at least in part, on the one or more fingerprint valley time intervals.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices for controlling an ultrasonic sensor system to obtain first ultrasonic data from at least a part of a target object proximate a surface of an apparatus and for receiving the first ultrasonic data from the ultrasonic sensor system. In some examples, the software may include instructions for identifying one or more fingerprint ridge features and one or more fingerprint valley features corresponding to the first ultrasonic data. In some implementations, the software may include instructions for determining, based on the first ultrasonic data, one or more fingerprint valley time intervals corresponding to a depth of one or more fingerprint valley features. In some examples, the software may include instructions for performing a spoof detection process based, at least in part, on the one or more fingerprint valley time intervals.

According to some implementations, the software may include instructions for converting the fingerprint valley time intervals to fingerprint valley depths. In some such implementations, the spoof detection process may involve comparing the fingerprint valley depths with a range of expected fingerprint valley depths.

In some implementations, controlling the ultrasonic sensor system to obtain the first ultrasonic data may involve controlling the ultrasonic sensor system to obtain the first ultrasonic data during a first acquisition time window after a first acquisition time delay. According to some such implementations, the software may include instructions for controlling the ultrasonic sensor system to obtain second ultrasonic data from at least the part of the target object during a second acquisition time window. The second acquisition time window may, in some examples, be after a second acquisition time delay that is longer than the first acquisition time delay. According to some implementations, the second acquisition time delay may correspond to a depth below a typical ridge-to-valley depth of a fingerprint. In some examples, the software may include instructions for receiving, from the ultrasonic sensor system, the second ultrasonic data and for performing the spoof detection process based, at least in part, on the second ultrasonic data.

In some examples, the software may include instructions for controlling the ultrasonic sensor system to obtain second through Nth ultrasonic data during second through Nth acquisition time windows after second through Nth acquisition time delays. According to some such examples, the software may include instructions for receiving the second through Nth ultrasonic data from the ultrasonic sensor system and for constructing a three-dimensional representation of fingerprint ridges and fingerprint valleys based on the first through Nth ultrasonic data.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
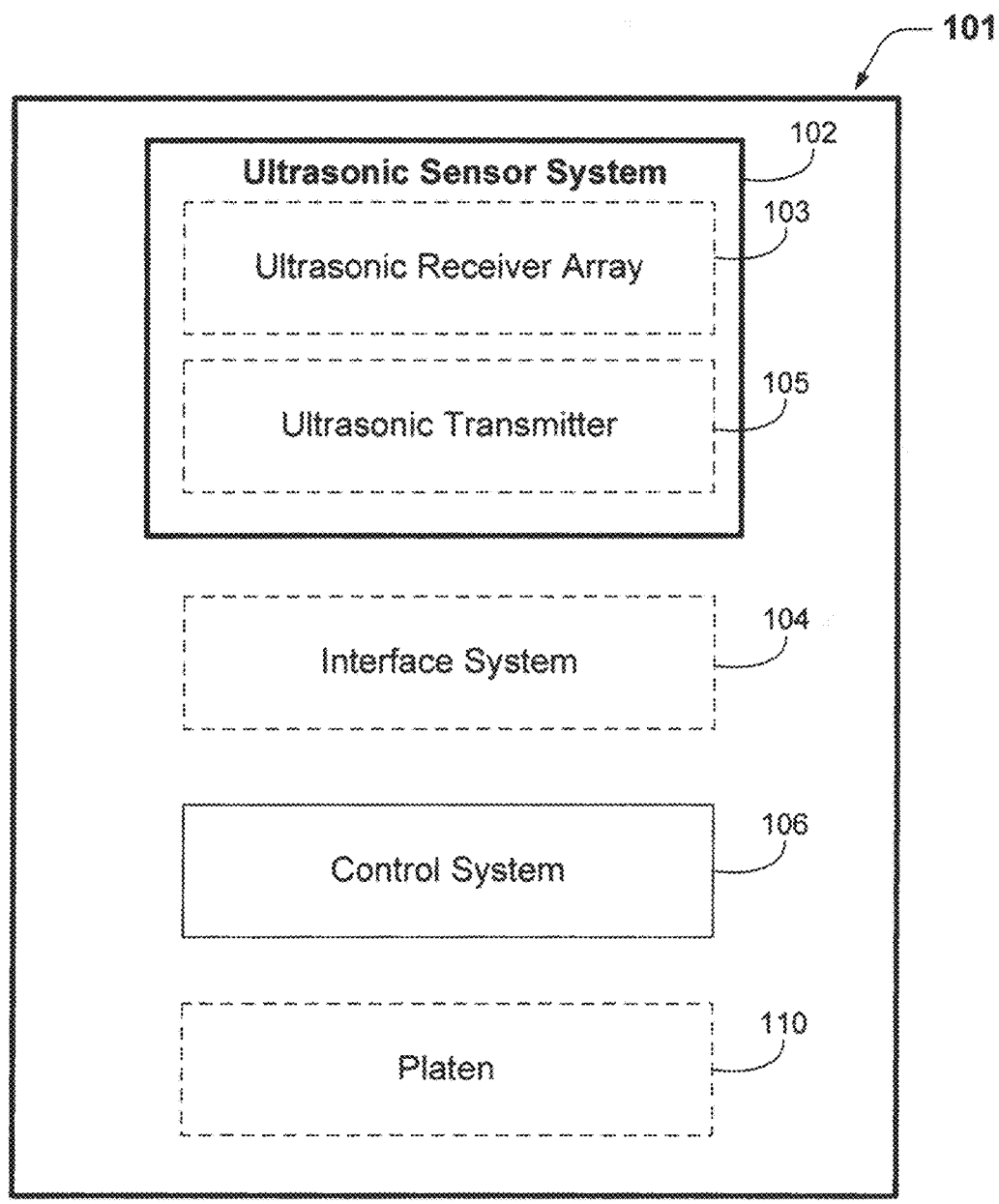
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations may include an ultrasonic sensor system that is capable of obtaining ultrasonic data from at least a part of a target object. In some instances, a control system may be capable of identifying fingerprint features, including but not limited to fingerprint ridge features and/or fingerprint valley features, corresponding to the ultrasonic data. The control system may be capable of determining, based on the ultrasonic data, one or more of what will be referred to herein as "fingerprint valley time intervals" corresponding to a depth of one or more fingerprint valley features. The one or more fingerprint valley time intervals may, for example, be ridge-to-valley time intervals measured from a crest, or peak, of a fingerprint ridge feature to a trough of an adjacent fingerprint valley feature. However, the one or more fingerprint valley time intervals may be measured in other ways, depending on the particular implementation. For example, the one or more fingerprint valley time intervals may be measured from a midway point between the crest of a fingerprint ridge feature and a trough of an adjacent fingerprint valley feature.

The control system may be capable of performing a spoof detection process based on the one or more fingerprint valley time intervals. In some examples, the control system may be capable of converting the fingerprint valley time intervals to fingerprint valley depths. The spoof detection process may involve comparing the fingerprint valley depths with an expected range of fingerprint valley depths.

Particular implementations of the subject matter described in this disclosure may be implemented to realize one or more of the following potential advantages. "Non-cooperative spoofs," in which a hacker obtains a rightful user's fingerprint image without the rightful user's permission, are typically used to gain illicit access to a smartphone or another such device. Non-cooperative spoofs are generally fabricated from photographs of a finger or from forensic means such as isocyanate fuming of skin oils left on a smart phone surface. As such, depth information about the fingerprint is lost. Therefore, a spoof detection process that involves comparing measured fingerprint valley depths with an expected range of fingerprint valley depths may be capable of identifying many common non-cooperative spoofs.

Figure 4:
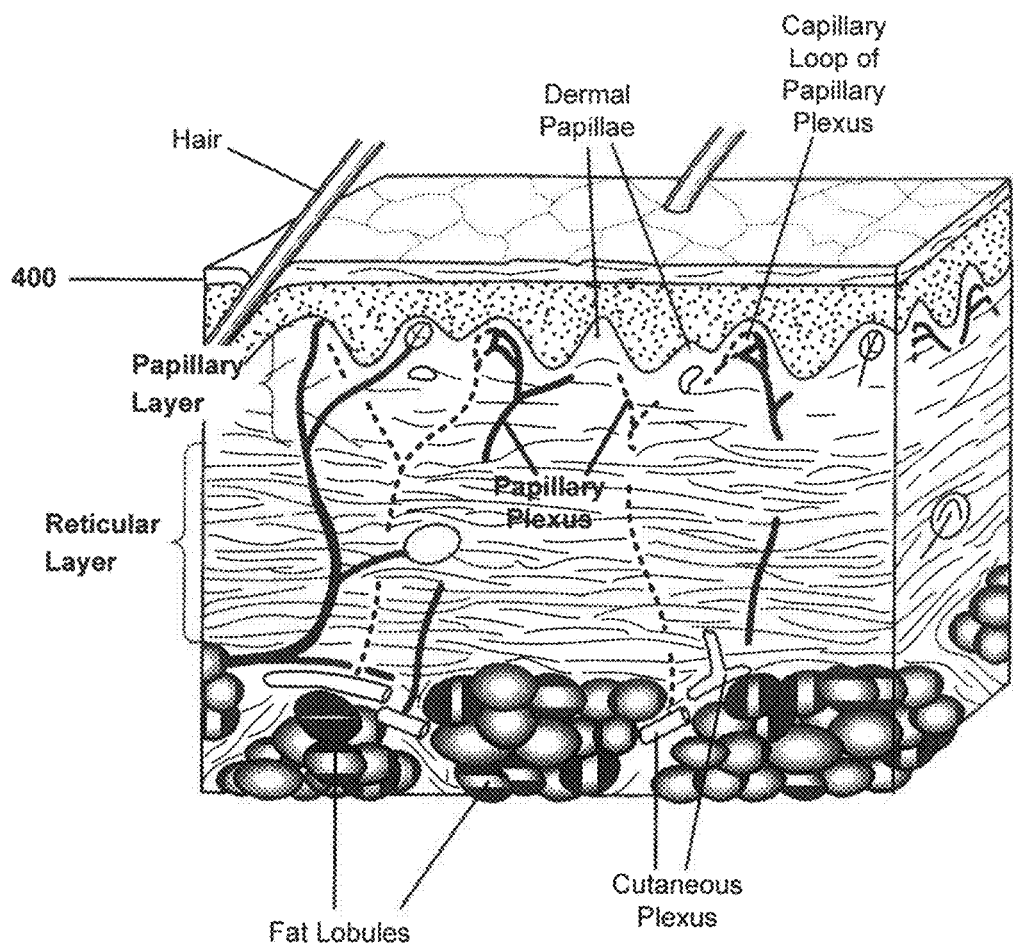
FIG. 4 shows examples of sub-epidermal features.

Some implementations may involve obtaining ultrasonic data from a depth below a typical ridge-to-valley depth of a fingerprint. In some instances, the ultrasonic data may correspond to sub-epidermal features. As used herein, the term "sub-epidermal features" may refer to any of the tissue layers that underlie the epidermis, including the dermis, the papillary layer, the reticular layer, the subcutis, etc., and any blood vessels, lymph vessels, sweat glands, hair follicles, hair papilla, fat lobules, muscle tissue features, bone tissue features, etc. Some examples are shown in FIG. 4 and are described below.

As noted elsewhere herein, some spoofing techniques are based on forming fingerprint-like features on an object, which may be a finger-like object. However, making a finger-like object with detailed sub-epidermal features would be challenging and expensive. Making such features accurately correspond with those of an authorized user would be even more challenging. Because some disclosed implementations involve obtaining ultrasonic data that corresponds, at least in part, to sub-epidermal features, some such implementations may provide yet more reliable spoof detection and/or authentication processes.

FIG. 1 is a block diagram that shows example components of an apparatus according to some disclosed implementations. In this example, the apparatus 101 includes an ultrasonic sensor system 102 and a control system 106. Some implementations of the apparatus 101 may include an interface system 104 and/or a platen 110.

In some examples, as suggested by the dashed lines within the ultrasonic sensor system 102, the ultrasonic sensor system 102 may include an ultrasonic receiver array 103 and a separate ultrasonic transmitter 105. In some such examples, the ultrasonic transmitter 105 may include an ultrasonic plane-wave generator, such as those described below.

However, various examples of ultrasonic sensor systems 102 are disclosed herein, some of which may include a separate ultrasonic transmitter 105 and some of which may not. Although shown as separate elements in FIG. 1, in some implementations the ultrasonic receiver array 103 and the ultrasonic transmitter 105 may be combined in an ultrasonic transceiver system. For example, in some implementations, the ultrasonic sensor system 102 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be capable of receiving and processing data from the ultrasonic sensor system 102, e.g., from the ultrasonic receiver array 103. Data received from the ultrasonic sensor system 102 may be referred to herein as "ultrasonic data," although such data may be manifested as electrical signals. If the apparatus 101 includes a separate ultrasonic transmitter 105, the control system 106 may be capable of controlling the ultrasonic transmitter 105, e.g., as disclosed elsewhere herein. In some implementations, functionality of the control system 106 may be partitioned between one or more controllers or processors, such as a dedicated sensor controller and an applications processor of a mobile device.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102. According to some such examples, a portion of the interface system 104 may couple at least a portion of the control system 106 to the ultrasonic sensor system 102, e.g., via electrically conducting material. If the apparatus 101 includes an ultrasonic transmitter 105 that is separate from the ultrasonic receiver array 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smart phone). The interface system 104 also may, in some such examples, reside in more than one device.

Figure 2:
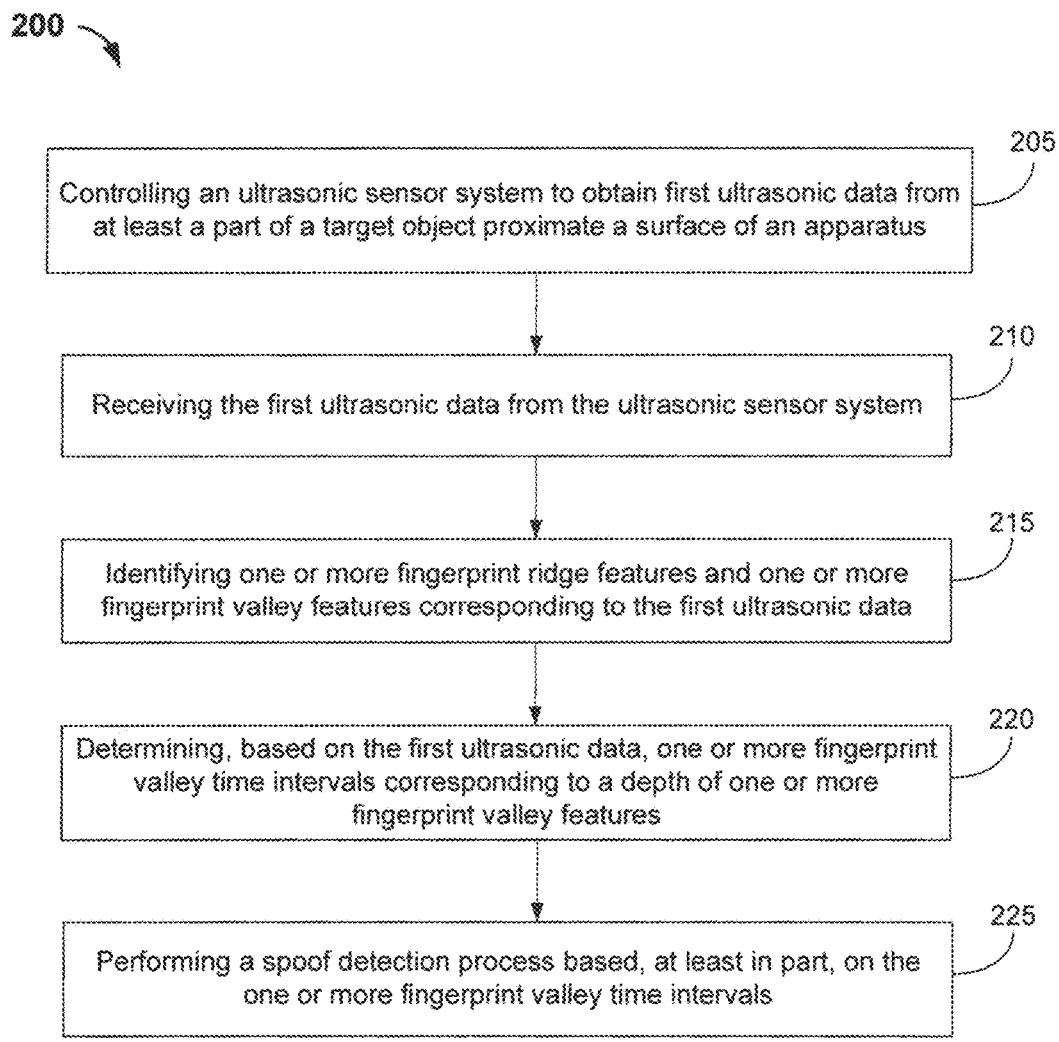
FIG. 2 is a flow diagram that provides examples of ultrasonic sensor system operations.

FIG. 2 is a flow diagram that provides examples of ultrasonic sensor system operations. The blocks of FIG. 2 (and those of other flow diagrams provided herein) may, for example, be performed by the apparatus 101 of FIG. 1 or by a similar apparatus. As with other methods disclosed herein, the method 200 outlined in FIG. 2 may include more or fewer blocks than indicated. Moreover, the blocks of methods disclosed herein are not necessarily performed in the order indicated.

In this example, block 205 involves controlling an ultrasonic sensor system to obtain first ultrasonic data from at least a part of a target object. According to this example, the target object is proximate a surface of an apparatus. The apparatus may be the apparatus 101 of FIG. 1 or a similar apparatus. The target object may, for example, be proximate the platen 110 of the apparatus 101.

According to this example, block 210 involves receiving the first ultrasonic data from the ultrasonic sensor system. Block 210 may, for example, involve the control system 106 of apparatus 101 receiving the first ultrasonic data from the ultrasonic sensor system 102.

According to this example, block 210 involves receiving the first ultrasonic data from the ultrasonic sensor system. Block 210 may, for example, involve the control system 106 of apparatus 101 receiving the first ultrasonic data from the ultrasonic sensor system 102.

In this implementation, block 215 involves identifying one or more fingerprint ridge features and one or more fingerprint valley features corresponding to the first ultrasonic data. As used herein, the phrase "fingerprint ridge features" refers to features of the first ultrasonic data that can be caused by fingerprint ridge structures and the phrase "fingerprint valley features" refers to features of the first ultrasonic data that can be caused by fingerprint valley structures.

Fingerprint ridge and valley structures are the result of the outer skin surface (the epidermis) conforming to similar structures just below the epidermis, particularly rows of dermal papillae. The fingerprint ridge structures and fingerprint valley structures take on the ridges and flow lines of these papillae. The fingerprint ridge structures and fingerprint valley structures may be identifiable in ultrasonic data resulting from reflections from a real fingerprint, but will generally be absent in ultrasonic data resulting from reflections from a spoof fingerprint. The fingerprint ridge structures and fingerprint valley structures may, for example, be identifiable according to peaks and valleys in the first ultrasonic data. Some examples are provided herein and are described below.

According to this example, block 220 involves determining, based on the first ultrasonic data, one or more fingerprint valley time intervals corresponding to a depth of one or more fingerprint valley features. The one or more fingerprint valley time intervals may, for example, be ridge-to-valley time intervals measured from a crest, or peak, of a fingerprint ridge feature to a trough of an adjacent fingerprint valley feature. Some implementations may involve determining, based on the first ultrasonic data, one or more fingerprint ridge time intervals corresponding to a height of one or more fingerprint ridge features.

Figure 3:
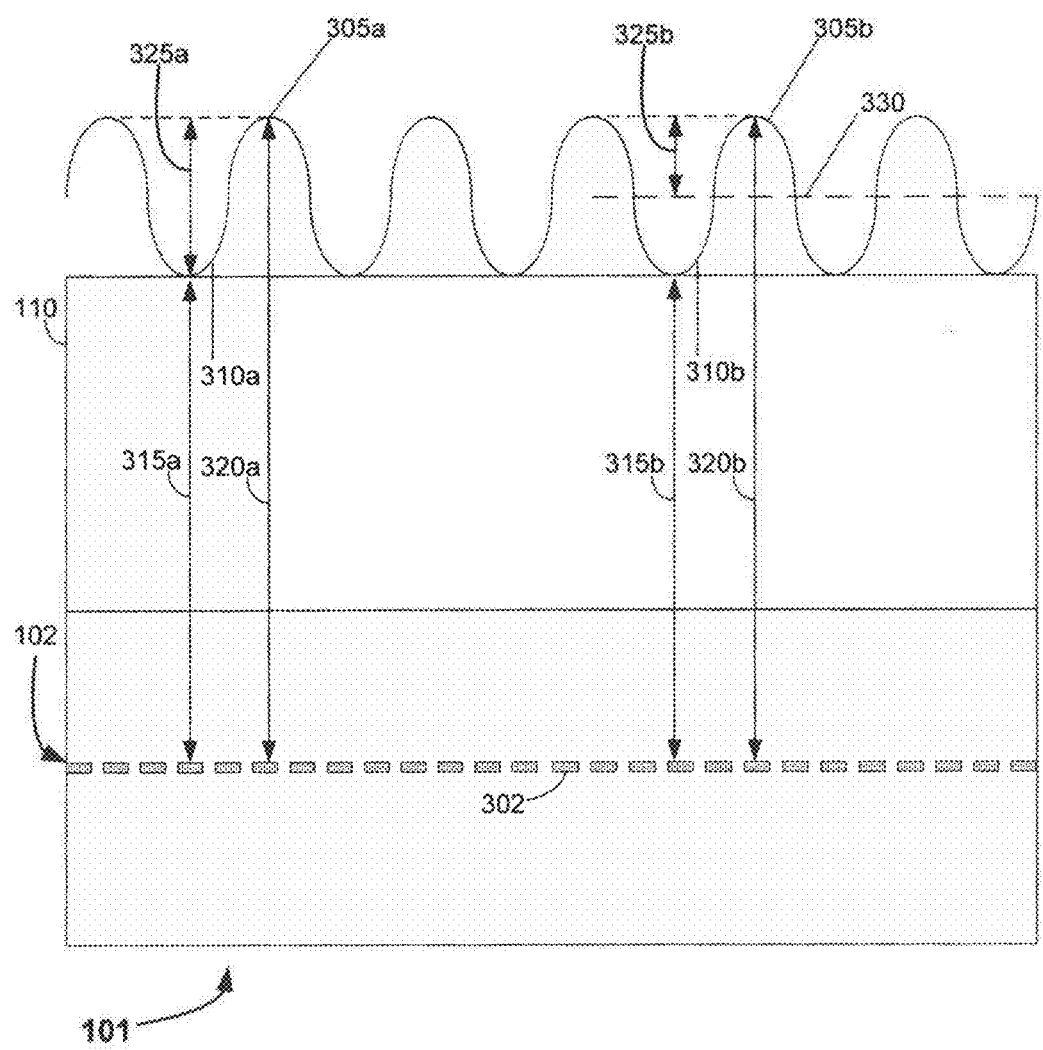
FIG. 3 shows a simplified example of a fingerprint proximate a platen of an apparatus that includes an ultrasonic sensor system.

FIG. 3 shows a simplified example of a fingerprint proximate a platen of an apparatus that includes an ultrasonic sensor system. In this example, fingerprint ridges 310a and 310b are in contact with a platen 110 of an apparatus 101 that includes an ultrasonic sensor system 102. Although the fingerprint ridges and valleys of an actual fingerprint would typically vary in size, in this simplified example the fingerprint ridges and valleys have uniform sizes.

Only a portion of the apparatus 101 is shown in FIG. 3. According to this implementation, the ultrasonic sensor system 102 includes an array of ultrasonic transducer elements 302. The ultrasonic transducer elements 302 may, for example, include an array of piezoelectric micromachined ultrasonic transducers (PMUTs), an array of capacitive micromachined ultrasonic transducers (CMUTs), etc.

In this example, the ray path 315a represents a pulse of ultrasound that has been emitted by the ultrasonic sensor system 102, a portion of which has reflected from the fingerprint ridge 310a and has been detected by the ultrasonic sensor system 102. Accordingly, in this example the ray path 315a corresponds to a two-way travel time $T_{R1}$ between the ultrasonic sensor system 102 and the fingerprint ridge 310a. Here, the ray path 320a represents a pulse of ultrasound that has been emitted by the ultrasonic sensor system 102, a portion of which has reflected from a trough of the adjacent fingerprint valley 305a and has been detected by the ultrasonic sensor system 102. Therefore, the ray path 320a corresponds to a two-way travel time $T_{V1}$ between the ultrasonic sensor system 102 and the trough of the adjacent fingerprint valley 305a. In one example, the fingerprint valley time interval 325a corresponds to the difference between these two-way travel times, which may be represented as $(T_{V1}-T_{R1})$ in this example. A fingerprint ridge time interval may be determined in a similar fashion.

However, the one or more fingerprint valley time intervals (or fingerprint ridge time intervals) may be measured in other ways, depending on the particular implementation. For example, the one or more fingerprint valley time intervals (or fingerprint ridge time intervals) may be measured from another reference or datum, such as a neutral axis between the crest of a fingerprint ridge feature and a trough of an adjacent fingerprint valley feature.

In another example shown in FIG. 3, the ray path 315b represents a pulse of ultrasound that has been emitted by the ultrasonic sensor system 102, a portion of which has reflected from the fingerprint ridge 310b and has been detected by the ultrasonic sensor system 102. Accordingly, in this example the ray path 315b corresponds to a two-way travel time $T_{R2}$ between the ultrasonic sensor system 102 and the fingerprint ridge 310b. Here, the ray path 320b represents a pulse of ultrasound that has been emitted by the ultrasonic sensor system 102, a portion of which has reflected from the trough of the adjacent fingerprint valley 305b and has been detected by the ultrasonic sensor system 102. Therefore, the ray path 320b corresponds to a two-way travel time $T_{V2}$ between the ultrasonic sensor system 102 and a trough of the adjacent fingerprint valley 305b. In this example, the fingerprint valley time interval 325b corresponds to half of the difference between these two-way travel times, which may be represented as $(T_{V2}-T_{R2})/2$ in this example. Accordingly, the fingerprint valley time interval 325b corresponds to a two-way travel time between the neutral axis 330 and the trough of the adjacent fingerprint valley 305b.

Returning to FIG. 2, in this example block 225 involves performing a spoof detection process that is based, at least in part, on the one or more fingerprint valley time intervals. For example, the control system 106 may be capable of performing a spoof detection process based on the one or more fingerprint valley time intervals that were determined in block 220. Such fingerprint valley time intervals may be referred to herein as "determined fingerprint valley time intervals." In some implementations, block 225 may involve performing a spoof detection process that is based, at least in part, on one or more determined fingerprint ridge time intervals.

According to some such examples, the control system 106 may be capable of comparing the one or more determined fingerprint valley time intervals to a range of expected fingerprint valley time intervals, e.g., by reference to a range of expected fingerprint valley time intervals that is stored in a memory. In some implementations block 225 may involve comparing a single determined fingerprint valley time interval to a range of expected fingerprint valley time intervals. According to some such implementations, if the determined fingerprint valley time interval is within the range of expected fingerprint valley time intervals, it may be determined that the target object includes an actual fingerprint and is not a spoof.

In alternative implementations, block 225 may involve comparing multiple determined fingerprint valley time intervals to a range of expected fingerprint valley time intervals. According to some such implementations, if one or more of the determined fingerprint valley time intervals are within the range of expected fingerprint valley time intervals, it may be determined that the target object includes an actual fingerprint and is not a spoof. In alternative implementations, if a majority of the determined fingerprint valley time intervals is within the range of expected fingerprint valley time intervals, it may be determined that the target object includes an actual fingerprint and is not a spoof.

According to some examples, a control system may compute an average value of multiple determined fingerprint valley time intervals. In some such examples, block 225 may involve comparing the average value to a range of expected fingerprint valley time intervals. According to some such implementations, if the average value is within the range of expected fingerprint valley time intervals, it may be determined that the target object includes an actual fingerprint and is not a spoof.

Other implementations may involve performing another type of mathematical operation, such as determining a weighted average value of multiple determined fingerprint valley time intervals, a mean value of multiple determined fingerprint valley time intervals, or another value that is based on multiple determined fingerprint valley time intervals. In some such examples, block 225 may involve comparing a result of the mathematical operation to a range of expected fingerprint valley time intervals. According to some such implementations, if the result of the mathematical operation is within the range of expected fingerprint valley time intervals, it may be determined that the target object includes an actual fingerprint and is not a spoof.

The range of expected fingerprint valley time intervals may, in some examples, be a range of expected fingerprint valley time intervals for human beings in general. In other implementations, the range of expected fingerprint valley time intervals may be a range of expected fingerprint valley time intervals for a particular individual. For example, the range of expected fingerprint valley time intervals may be determined during an enrolment process for a particular individual and stored for later reference. In some such implementations, the range of expected fingerprint valley time intervals may be a range of expected fingerprint valley time intervals for a particular digit of a particular individual, or for multiple digits of a particular individual.

In some examples, the control system 106 may be capable of converting the fingerprint valley time intervals to fingerprint valley depths. The spoof detection process may involve comparing one or more of the fingerprint valley depths (or a result of a mathematical operation that is performed on one or more of the fingerprint valley depths) with a range of expected fingerprint valley depths. The range of expected fingerprint valley depths may, in some examples, be a range of expected fingerprint valley time intervals for human beings in general, whereas in other implementations the range of expected fingerprint valley time intervals may be a range of expected fingerprint valley depths for a particular individual, such as a range of expected fingerprint valley depths for a particular digit of a particular individual, or a range of expected fingerprint valley depths for multiple digits of a particular individual.

In some implementations, the control system 106 may be capable of converting the fingerprint ridge time intervals to fingerprint ridge depths. Block 225 may involve performing a spoof detection process that is based, at least in part, on one or more fingerprint ridge depths.

Some implementations may include an ultrasonic sensor system that is capable of obtaining ultrasonic data from the epidermis, which may include ultrasonic data from which fingerprint features can be obtained, and that is also capable of obtaining ultrasonic data that corresponds to sub-epidermal features. Fingerprint features may, in some examples include fingerprint valley time intervals and/or fingerprint valley depth intervals. In some examples, fingerprint features may include fingerprint minutiae, keypoints and/or other features derived from ultrasonic data.

FIG. 4 shows examples of sub-epidermal features. As used herein, the term "sub-epidermal features" may refer to any of the tissue layers that underlie the epidermis 400, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 4, such as muscle tissue, bone material, etc.

Some implementations may be capable of performing one or more enrollment processes, spoof detection processes and/or authentication processes that are based, at least in part, on sub-epidermal features. Some such processes also may be based on fingerprint features. In some examples, an authentication processes may involve spoof detection and/or liveness detection processes.

In some examples, a spoof detection process and/or a user authentication process may involve comparing fingerprint features obtained from received ultrasonic data, from an ultrasonic sensor array, with stored information that has previously been obtained from an authorized user during an enrollment process. The fingerprint features may include fingerprint valley time intervals, fingerprint valley depth intervals and/or "attribute information" obtained from received ultrasonic data. The attribute information may include fingerprint minutiae, keypoints and/or other fingerprint features. According to some such examples, the attribute information may include information regarding sub-epidermal features, such as information regarding features of the dermis, features of the subcutis, blood vessel features, lymph vessel features, sweat gland features, hair follicle features, hair papilla features and/or fat lobule features, along with minutiae or keypoint information associated with an enrolled fingerprint.

Alternatively, or additionally, in some implementations the attribute information obtained from the received ultrasonic data and the stored attribute information may include information regarding bone tissue features, muscle tissue features and/or epidermal or sub-epidermal tissue features. For example, according to some implementations, a user authentication process may involve obtaining ultrasonic fingerprint data and ultrasonic data corresponding to a sub-epidermal one or more fingerprint features and one or more sub-epidermal features. In such examples, the authentication process may involve evaluating attribute information obtained from the fingerprint data and/or the sub-epidermal data.

The attribute information obtained from the received ultrasonic data and the stored attribute information that are compared during an authentication process may include biometric template data corresponding to the received ultrasonic data and biometric template data corresponding to the stored data. One well-known type of biometric template data is fingerprint template data, which may indicate types and locations of fingerprint minutia or keypoints. A user authentication process based on attributes of fingerprint image data may involve comparing received and stored fingerprint template data. Such a process may or may not involve directly comparing received and stored fingerprint image data.

Similarly, biometric template data corresponding to sub-epidermal features may include information regarding the attributes of blood vessels, such as information regarding the types and locations of blood vessel features, such as blood vessel size, blood vessel orientation, the locations of blood vessel branch points, etc. Alternatively, or additionally, biometric template data corresponding to sub-epidermal features may include attribute information regarding the types (e.g., the sizes, shapes, orientations, etc.) and locations of features of the dermis, features of the subcutis, lymph vessel features, sweat gland features, hair follicle features, hair papilla features, fat lobule features, muscle tissue and/or bone material.

In some implementations, controlling an ultrasonic sensor system to obtain first ultrasonic data from at least a part of a target object proximate a surface of an apparatus may involve controlling the ultrasonic sensor system to obtain the first ultrasonic data during a first acquisition time window after a first acquisition time delay. Some such examples may involve controlling the ultrasonic sensor system to obtain second ultrasonic data from at least a part of the target object during a second acquisition time window after a second acquisition time delay. According to some examples, second acquisition time delay may be longer than the first acquisition time delay. However, in some examples, the second acquisition time delay may be approximately the same as the first acquisition time delay. In alternative examples, the second acquisition time delay may be shorter than the first acquisition time delay.

In some examples, the first acquisition time delay and the first acquisition time window may cause at least a portion of the first ultrasonic data to correspond to a fingerprint feature of the target object. In some instances, the target object may be a person's finger, such as a user's finger. In some such examples, the second acquisition time delay and the second acquisition time window may cause at least a portion of the second ultrasonic data to correspond to a sub-epidermal feature of the user's finger.

Figure 5:
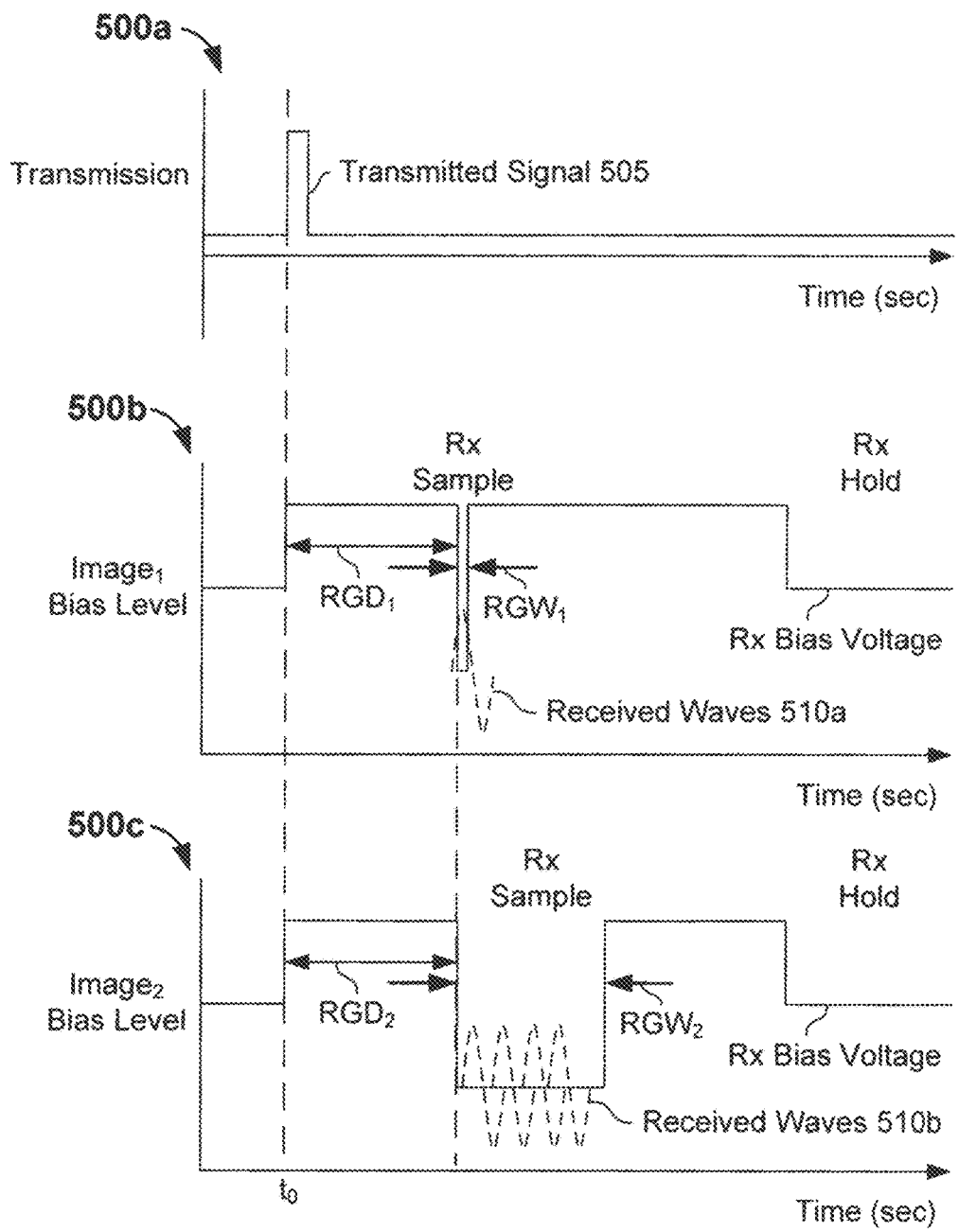
FIG. 5 shows some examples of acquisition time delays and acquisition time windows.

FIG. 5 shows some examples of acquisition time delays and acquisition time windows. In FIG. 5, an acquisition time delay is labeled as "RGD," an acronym for "range-gate delay," and an acquisition time window is labeled as "RGW," an acronym for "range-gate window." Graph 500a shows a transmitted signal 505 that is initiated at a time $t_0$. The transmitted signal 505 may, for example, be a pulse of ultrasound. In alternative examples, multiple pulses of ultrasound may be transmitted.

Graph 500b shows examples of a first acquisition time delay $RGD_1$ and a first acquisition time window $RGW_1$. The received waves 510a represent reflected waves that are received by an ultrasonic sensor array and sampled during the first acquisition time window $RGW_1$, after the first acquisition time delay $RGD_1$. In some examples, the acquisition time delay may be in the range of about 10 nanoseconds to about 20,000 nanoseconds or more. In some implementations, the first acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be in the range of 50 to 20,000 nanoseconds, or in the range of approximately 50 to 20,000 nanoseconds or more.

As noted above, in some examples the apparatus 101 of FIG. 1 may include a platen 110. The platen 110 may be positioned within the apparatus 101 at a known offset with respect to the ultrasonic sensor array 102. For example, the platen may be positioned proximate the ultrasonic sensor array 102 and/or attached to the ultrasonic sensor array 102. In some such examples, the first acquisition time delay may correspond to an expected amount of time for an ultrasonic wave reflected from a surface of the platen to be received by at least a portion of the ultrasonic sensor array 102. Accordingly, the first acquisition time delay and the first acquisition time window may be selected to capture one or more fingerprint features of a target object placed on a surface of a platen. For example, in some implementations with a platen about 400 microns thick, the acquisition time delay (RGD) may be set to about 1,000 nanoseconds and the acquisition time window (RGW) may be set to about 50 nanoseconds.

Graph 500c shows examples of a second acquisition time delay $RGD_2$ and a second acquisition time window $RGW_2$. The received waves 510b represent reflected waves that are received by an ultrasonic sensor array and sampled during the second acquisition time window $RGW_2$, after the second acquisition time delay $RGD_2$. In this example, the first acquisition time delay equals the second acquisition time delay. According to some examples, the first acquisition time delay and/or the second acquisition time delay may correspond to a time required for a transmitted ultrasonic wave to be reflected from a surface of a platen and received by at least a portion of the ultrasonic sensor array.

However, in other implementations, the first acquisition time delay may not equal the second acquisition time delay. In some such implementations, the second acquisition time delay may be longer than the first acquisition time delay. According to some such implementations, the second acquisition time delay may correspond to a depth below a typical ridge-to-valley depth of a fingerprint. In such implementations, at least a portion of the second ultrasonic data may correspond to a sub-epidermal feature of a finger.

In this example, the first acquisition time delay and the second acquisition time delay are both measured from the time $t_0$. However, in other implementations, the first acquisition time delay and the second acquisition time delay may be measured from a different initial time.

According to some implementations, the second acquisition time window may be in the range of 5 to 50 nanoseconds, or in the range of approximately 5 to 50 nanoseconds. However, in some implementations the second acquisition time window may be in the range of 50 to 2,000 nanoseconds, or in the range of approximately 50 to 2,000 nanoseconds. In some examples the second acquisition time window may be in the range of 2,000 to 20,000 nanoseconds, or in the range of approximately 2,000 to 20,000 nanoseconds or more. In some examples, the second acquisition time delay and the second acquisition time window may be selected to capture to a fingerprint feature of the target object and a sub-epidermal feature of the target object. For example, in some implementations with a platen about 400 microns thick, the acquisition time delay (RGD) may be set to about 1,000 nanoseconds and the acquisition time window (RGW) may be set to about 1,000 nanoseconds.

Figure 6A:
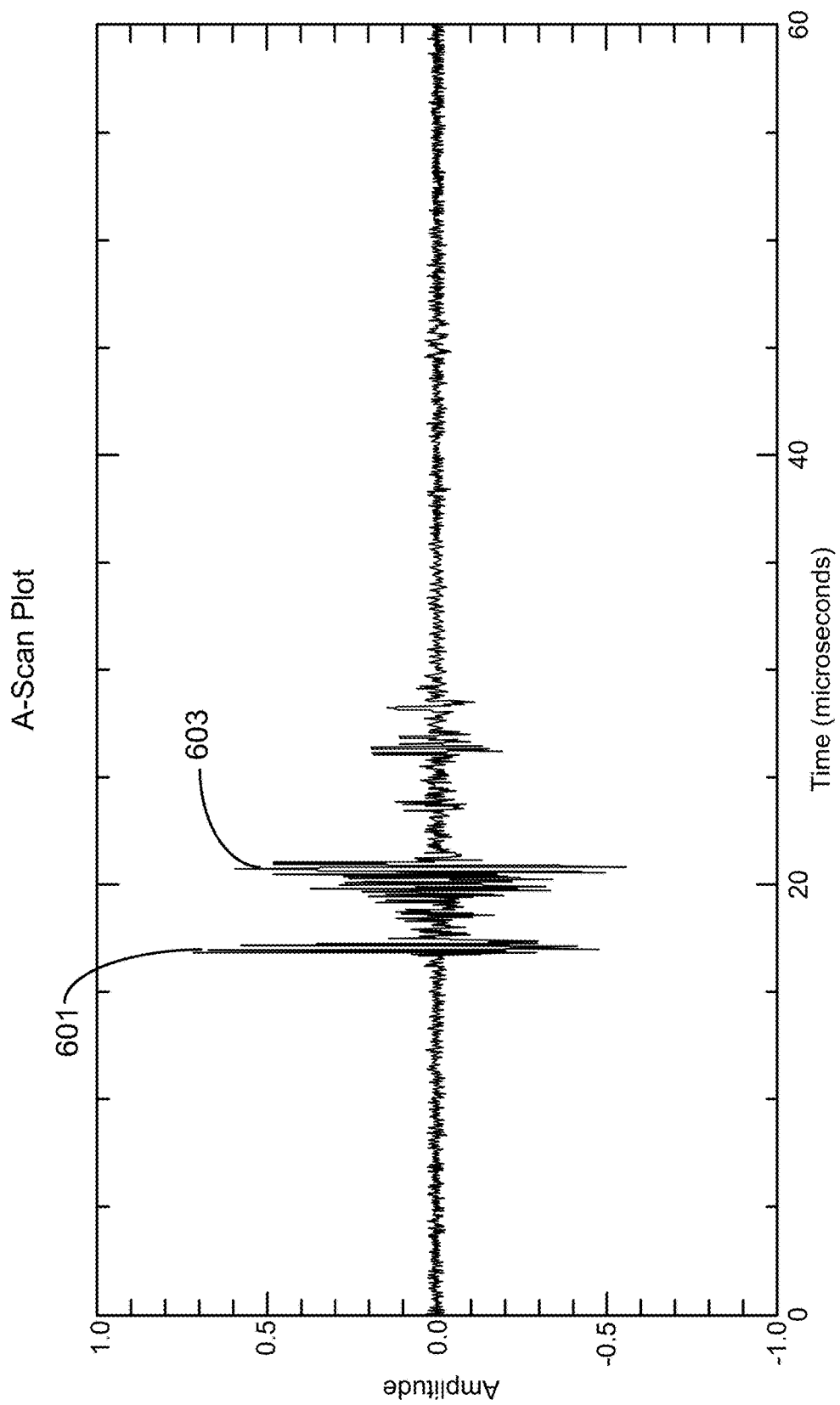
FIGS. 6A-6C show examples of A-scan, B-scan and C-scan images.
Figures 6B, 6C:
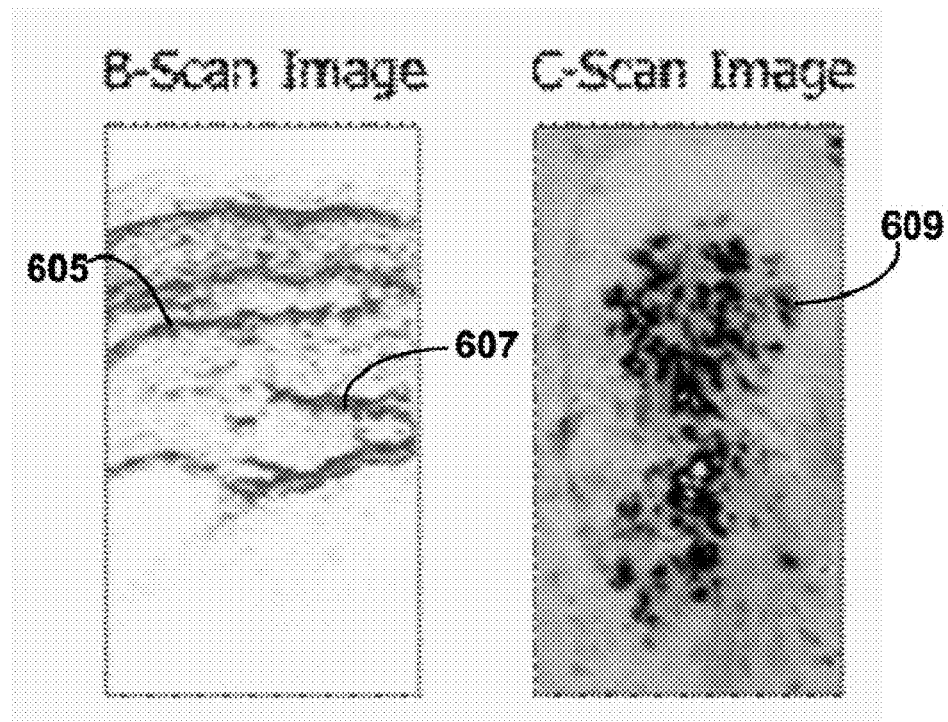

FIGS. 6A-6C show examples of A-scan, B-scan and C-scan images. As shown in FIG. 6A, an A-scan plot of reflection amplitude versus time may be obtained from a single ultrasonic receiver or transceiver, such as a sensor pixel or a small group of sensor pixels. The high-amplitude events shown in FIG. 6A indicate reflections from within a target object, such as a finger, caused by acoustic impedance contrast within the target object. The surface of a bone, for example, generally has a relatively high acoustic impedance contrast with the overlying tissue and therefore produces a relatively high-amplitude reflection. The presence of multiple reflections in an A-scan, such as the reflections 601 and 603 shown in FIG. 6A, indicates that the target object is not, for example, air or a solid piece of silicone rubber or other such material that may be used for spoofing.

The presence of such reflections, in conjunction with an indication that one or more determined fingerprint valley time intervals are with a range of expected fingerprint valley time intervals (and/or an indication that one or more determined fingerprint valley depths are with a range of expected fingerprint valley depths), would suggest that the target object is actually a finger. However, a fake finger could be made with multiple layers having different acoustic impedances.

A B-scan image, such as that shown in FIG. 6B, may be obtained from a single row or column of ultrasonic receivers or transceivers. In this example, travel time is along the vertical axis of the B-scan image. Various reflections, including reflections 605 and 607, may be seen in the B-scan image of FIG. 6B. The reflections 605 and 607 correspond to sub-epidermal features of a finger in this example. The presence of such complex features provides a stronger indication that the target object is actually a finger, as compared with A-scan image data.

A C-scan image may be obtained from an array of ultrasonic receivers or transceivers, such as a grid of ultrasonic receivers or transceivers or a focused single-element transceiver with arcuate and translational mechanical motion capability. In the example shown in FIG. 6C, ultrasonic image data has been obtained at a depth suitable for obtaining a 2-D C-scan image of sub-epidermal features, such as the feature 609 that corresponds to a region of elevated acoustic impedance contrast, such as sub-epidermal vasculature or aggregates of fatty tissue. The depth may correspond with a selected time interval between the time ultrasound is transmitted and the time during which reflected ultrasonic waves are sampled (which may be referred to herein as the acquisition time delay or the range-gate delay (RGD)). For example, a relatively larger range-gate delay may be selected to receive reflected ultrasonic waves primarily from bones and a relatively smaller range-gate delay may be selected to receive reflected ultrasonic waves primarily from ridges and valleys of a fingerprint or sub-epidermal features such as blood vessels, blood, muscle tissue features or bone tissue features.

The amount of detail in the C-scan image provides yet stronger indications that the target object is actually a finger. Accordingly, such additional details can provide a relatively more reliable spoof detection process than a spoof detection process that is based only on one or more fingerprint valley time intervals, one or more fingerprint valley depths, or the like. Moreover, sub-epidermal features are indicated in sufficient detail such that their corresponding attribute information may be used as part of an authentication process, such as distinctive C-scan features referenced in depth and offset with respect to one or more fingerprint minutiae of a rightful user's finger.

Figure 7:
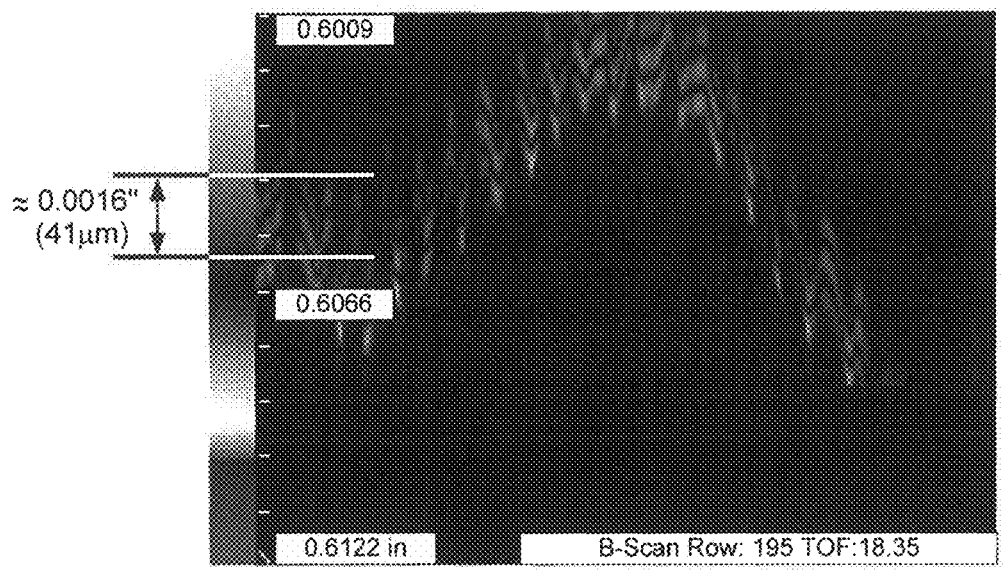
FIG. 7 includes an image that is based on an actual B-scan of one inventor's thumb.

FIG. 7 includes an image that is based on an actual B-scan of one inventor's thumb. In this example, each mark on the left side of the image represents a distance of 0.00114 inches. The depth of the valley at the indicated area is approximately 1.4 marks, which is approximately 0.0016 inches or approximately 41 microns.

Figure 8:
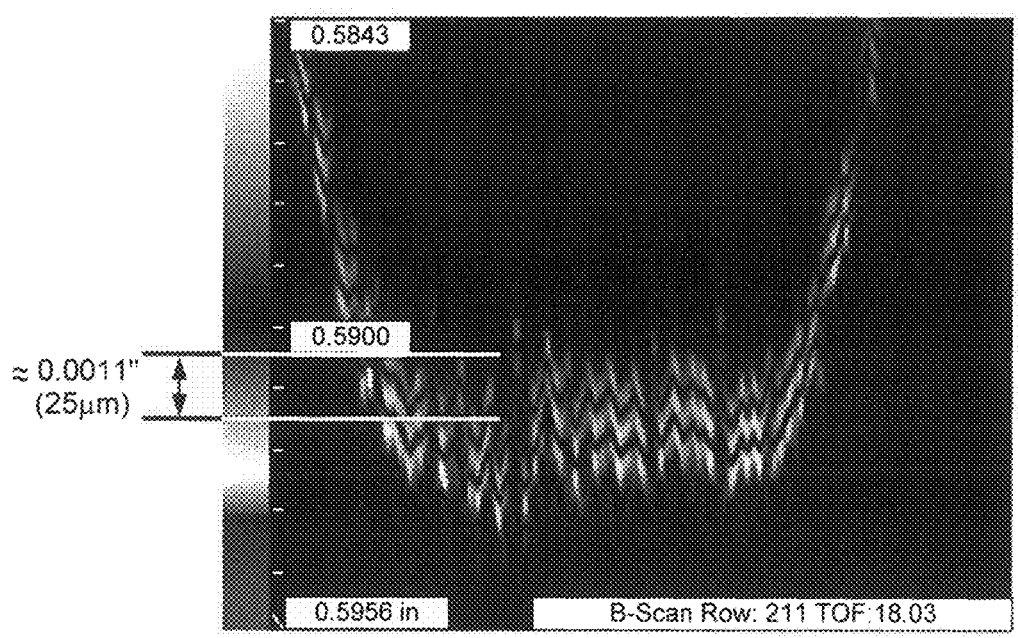
FIG. 8 includes an image that is based on an actual B-scan of another inventor's thumb.

FIG. 8 includes an image that is based on an actual B-scan of another inventor's thumb. In this example, each mark on the left side of the image represents a distance of 0.00114 inches. The depth of the valley at the indicated area is approximately 1.0 mark, which is approximately 0.0011 inches or approximately 25 microns.

During a conventional process of obtaining a fingerprint image, only a 2-D image is normally acquired. Such 2-D fingerprint images lack some information related to the actual geometry of the fingerprint, such as ridge-valley depth. Some forms of a spoofed fingerprint may lack such 3-D features. Therefore, evaluating such 3-D features can both increase the accuracy of a fingerprint matching process and be at least one factor in a spoof detection process.

Accordingly, some implementations involve obtaining a 3-D image of at least a portion of a target object. In some examples, the 3-D image may be obtained from a relatively shallow depth and may be a 3-D image of a fingerprint.

Figure 9:
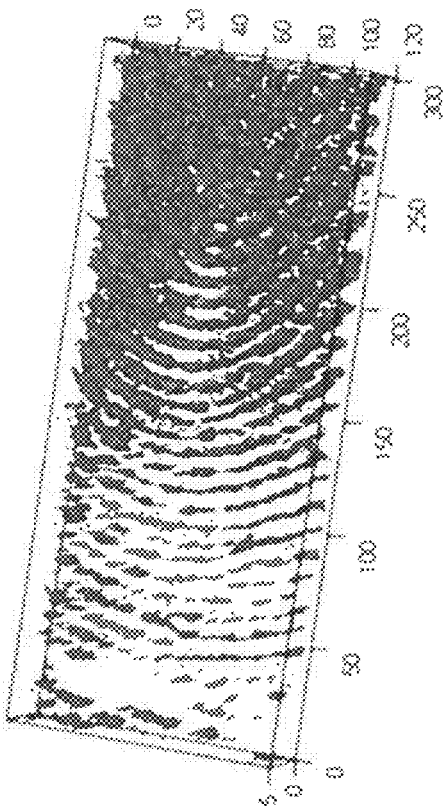
FIG. 9 shows an example of a 3-D image of a fingerprint.

FIG. 9 shows an example of a 3-D image of a fingerprint. The dimensions shown in FIG. 9 are merely examples. Some implementations may involve obtaining ultrasonic image data at one or more depths suitable for obtaining one or more 3-D images of sub-epidermal features. As noted above, the depths may correspond with selected acquisition time delays. In some implementations, 3-D or volumetric images of a finger may be constructed from a larger number of A-scan images, B-scan images or C-scan images. Such 3-D or volumetric images, and/or data relating to such 3-D or volumetric images, may be used for a more reliable anti-spoofing process, a more reliable authentication process, or both.

Figure 10:
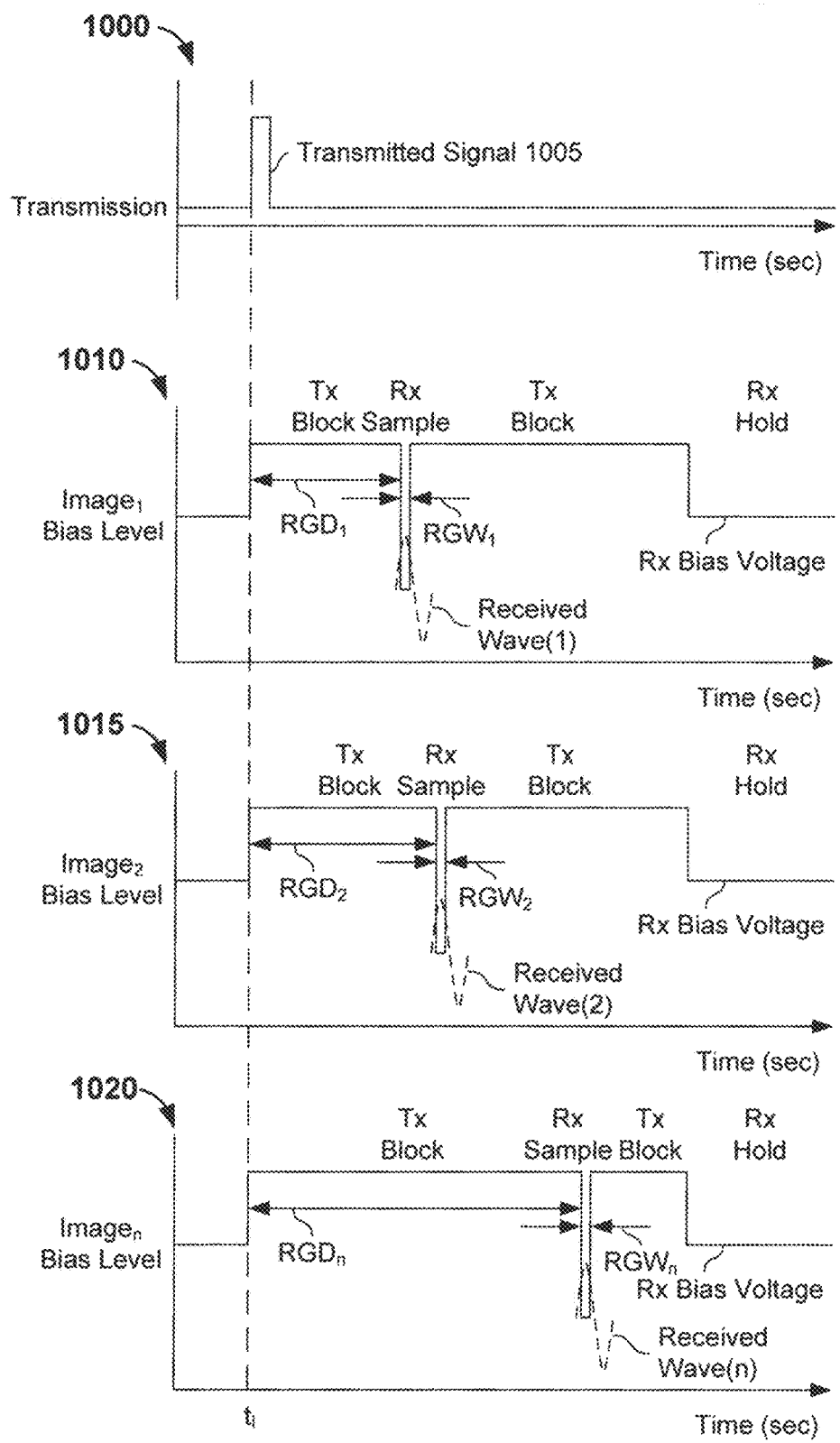
FIG. 10 shows examples of multiple acquisition time delays being selected to receive acoustic waves reflected from different depths.

In some instances, a control system may be capable of acquiring first through $N^{th}$ ultrasonic image data during first through $N^{th}$ acquisition time windows after first through $N^{th}$ acquisition time delays. One such example is shown in FIG. 10 and is described below. Each of the first through $N^{th}$ acquisition time delays may correspond to a first through an $N^{th}$ depth inside the target object. For example, a volumetric image of a finger or a finger portion may be generated from multiple acquisitions of image data at various depths into the finger or along particular finger features such as hair follicles or sweat pores.

Some implementations may involve selecting one or more acquisition time delays and/or acquisition time windows (also referred to as a range-gate window or RGW) as part of an authentication or a spoof detection process. For example, if a sleeve having a fingerprint formed on it has been placed on or over a hacker's finger, there should be a relatively homogeneous sleeve layer between the fake fingerprint and the hacker's finger that does not include sub-epidermal features that are characteristic of a finger. Therefore, in order to evaluate whether a sleeve having a fingerprint formed on it has been placed over a hacker's finger in a spoofing attempt, one or more acquisition time delays with a relatively short RGW may be selected to determine whether there is a layer beneath a fingerprint layer that does not appear to include features that are characteristic of a finger. Some such implementations may involve selecting one or more acquisition time delays and acquisition time windows suitable for determining whether there is a second fingerprint beneath a sleeve/non-finger layer, such as a fingerprint of a rightful user positioned over a fingerprint of an imposter. Some implementations may involve selecting one or more finger features such as a sweat pore and imaging the region of the sweat pore at various depths interior to the finger surface to verify that the feature is continuous and characteristic of the rightful user's finger rather than a spoof.

Alternatively, or additionally, some implementations may involve selecting one or more acquisition time windows as part of an authentication or a spoof detection process. In some such examples, an acquisition time delay and a relatively long acquisition time window may be selected in order to obtain image data that includes a fingerprint image superimposed on an image of one or more sub-epidermal features.

In some implementations, a receiver bias control signal may be applied to a receiver bias electrode that is coupled to a piezoelectric receiver layer associated with an ultrasonic sensor array. The ultrasonic sensor array may include an array of sensor pixel circuits configured on a silicon, glass or plastic substrate. In some implementations, the sensor pixel circuits may comprise a collection of silicon or thin-film transistors, capacitors and a diode for rectifying and capturing signal information when the piezoelectric receiver layer receives an ultrasonic wave. One or more ultrasonic waves may be launched from an ultrasonic transmitter and reflected from a surface of a platen coupled to the ultrasonic sensor array. A finger or other target object placed on the surface of the platen may be imaged due to acoustic impedance mismatches between the platen and portions of the finger (e.g., ridges and valleys). The amplitude of the reflected waves depends in part on the degree of acoustic impedance mismatch at the platen surface. Selection of an appropriate RGD and a relatively narrow RGW allows images of the fingerprint ridges and valleys at the surface of the platen to be acquired by the ultrasonic sensor array.

FIG. 10 shows examples of multiple acquisition time delays being selected to receive acoustic waves reflected from different depths. In these examples, each of the acquisition time delays (which are labeled range-gate delays or RGDs in FIG. 10) is measured from the beginning time $t_1$ of the transmitted signal 1005 shown in graph 1000. The graph 1010 depicts reflected acoustic waves (received wave (1) is one example) that may be received by an ultrasonic sensor array at an acquisition time delay $RGD_1$ and sampled during an acquisition time window of $RGW_1$. Such acoustic waves will generally be reflected from a relatively shallower portion of a target object proximate, or positioned upon, a platen of the biometric system.

Graph 1015 depicts reflected acoustic waves (received wave (2) is one example) that are received by at least a portion of the ultrasonic sensor array at an acquisition time delay $RGD_2$ (with $RGD_2 > RGD_1$) and sampled during an acquisition time window of $RGW_2$. Such acoustic waves will generally be reflected from a relatively deeper portion of the target object. Graph 1020 depicts reflected acoustic waves (received wave (n) is one example) that are received at an acquisition time delay $RGD_n$ (with $RGD_n > RGD_2 > RGD_1$) and sampled during an acquisition time window of $RGW_n$. Such acoustic waves will generally be reflected from a still deeper portion of the target object.

Range-gate delays are typically integer multiples of a clock period. A clock frequency of 128 MHz, for example, has a clock period of 7.8125 nanoseconds, and RGDs may range from under 10 nanoseconds to over 20,000 nanoseconds.

Similarly, the range-gate windows may also be integer multiples of the clock period, but are often much shorter than the RGD (e.g. less than about 50 nanoseconds) to capture returning signals while retaining good axial resolution. In some implementations, the acquisition time window (RGW) may be between about 10 nanoseconds to about 200 nanoseconds. In some examples, the RGW may be less than 10 nanoseconds, e.g., 5 nanoseconds, 6 nanoseconds, 7 nanoseconds or 8 nanoseconds. Such implementations may be advantageous for acquiring ultrasonic data for a 3D image, e.g., for a 3D fingerprint image. However, in some examples the RGW may be more than 200 nanoseconds.

Extending the duration of the range-gate width while keeping the RGD constant allows the sensor pixel circuits to capture the peak value of the reflected ultrasonic waves corresponding to the fingerprint ridges and valleys and to sub-epidermal features that may be captured during the time that the RGW is active. Increasing the RGD allows imaging of sub-epidermal features deeper into the finger.

Note that while various image bias levels (e.g. Tx block, Rx sample and Rx hold that may be applied to an Rx bias electrode) may be in the single or low double-digit volt range, the return signals may have voltages in the tens or hundreds of millivolts. In some implementations, the receiver bias control signal having two or more levels representing the selected RGD and RGW may be applied to the receiver bias electrode of the ultrasonic sensor array. In some implementations, a diode bias control signal applied to the sensor pixel circuits within the ultrasonic sensor array may contain two or more levels representing the selected RGD and RGW. In some implementations, a portion of the sensor pixel circuits, such as a block, line or sub-array of pixels, may be used to acquire one or more images in a sub-surface region of the target object at the desired depth and position to increase the frame rate and reduce the image processing requirements.

Figure 11:
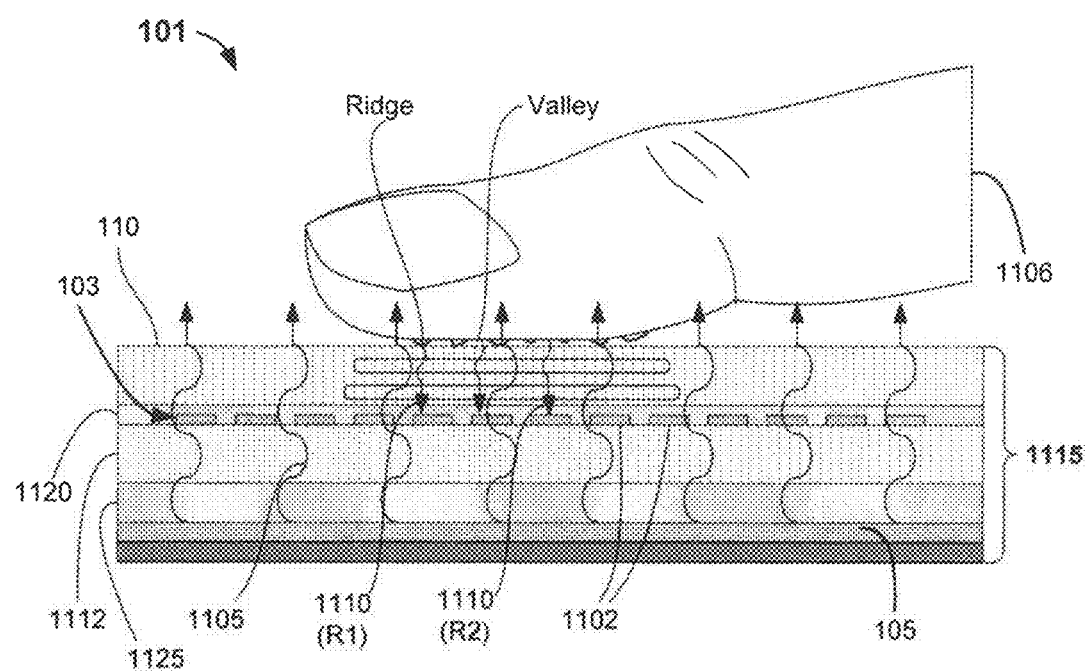
FIG. 11 shows an example of a cross-sectional view of an apparatus capable of performing at least some methods that are described herein.

FIG. 11 shows an example of a cross-sectional view of an apparatus capable of performing at least some methods that are described herein. In this example, the apparatus 101 is an example of the apparatus 101 that is described above with reference to FIG. 1. Accordingly, the apparatus 101 may be capable of performing the methods that are described above, e.g., with reference to FIGS. 1 and 2. As with other implementations shown and described herein, the types of elements, the arrangement of the elements and the dimensions of the elements illustrated in FIG. 11 are merely shown by way of example.

In this example, the ultrasonic sensor system includes an ultrasonic transmitter 105 that is separate from an ultrasonic receiver array 103. In the example shown in FIG. 11, the ultrasonic transmitter 105 can function as a plane-wave ultrasonic transmitter. In some implementations, the ultrasonic transmitter 105 may include a piezoelectric transmitter layer with transmitter excitation electrodes disposed on each side of the piezoelectric transmitter layer.

In some such examples, the ultrasonic receiver array 103 may include an array of pixel input electrodes and sensor pixels formed in part from TFT circuitry, an overlying piezoelectric receiver layer 1120 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below with reference to FIGS. 11A and 11B.

However, in alternative implementations, the ultrasonic receiver array 103 and the ultrasonic transmitter 105 may be combined in an ultrasonic transceiver array. For example, in some implementations, the ultrasonic sensor system may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this implementation, the substrate 1125 is coupled to a thin-film transistor (TFT) substrate 1112 for the ultrasonic sensor system. According to this example, a piezoelectric receiver layer 1120 overlies the sensor pixels 1102 of the ultrasonic receiver array 103 and the platen 110 overlies the piezoelectric receiver layer 1120. Accordingly, in this example the apparatus 101 is capable of transmitting the ultrasonic waves 1105 through one or more substrates of the sensor stack 1115 that include the ultrasonic sensor system with substrate 1112, as well as the platen 110 that may also be viewed as a substrate. In some implementations, sensor pixels 1102 of the ultrasonic receiver array 103 may be transparent, partially transparent or substantially transparent, such that the apparatus 101 may be capable of transmitting light from a light source system through elements of the ultrasonic sensor system. In some implementations, the ultrasonic sensor system and associated circuitry may be formed on or in a glass, plastic or silicon substrate. However, in other implementations one or more of the substrates of the apparatus 101 may be translucent or opaque to visible light.

FIG. 11 shows examples of ultrasonic waves reflecting from a target object. In this example, the target object is a finger 1106 being insonified by transmitted ultrasonic waves 1105. In this example, at least some of the transmitted ultrasonic waves 1105 have been transmitted from the ultrasonic transmitter 105 through a sensor stack 1115 and into (or onto) the overlying finger 1106. The various layers of the sensor stack 1115 may, in some examples, include one or more substrates of glass or other material (such as plastic or sapphire) that is substantially transparent to visible light. In this example, the sensor stack 1115 includes a substrate 1125 to which a light source system (not shown) may be coupled, which may be a backlight of a display according to some implementations. In alternative implementations, a light source system may be coupled to a front light. Accordingly, in some implementations a light source system may be configured for illuminating a display and the target object.

Here, the reflected ultrasonic waves 1110 that are received by the ultrasonic sensor system 102 include instances of R1, reflected from interfaces between the platen 110 and fingerprint ridges, as well as instances of R2, reflected from interfaces between the platen 110 and air/fingerprint valleys. Signals indicating fingerprint ridge features may generally be obtained from sensor pixels of the ultrasonic sensor system that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/skin interface, corresponding to areas in which fingerprint ridges are in contact with a platen.

In various examples disclosed herein, R1 will represent a reflection from a platen/fingerprint ridge interface and R2 will represent a reflection from a platen/fingerprint valley interface. The amplitude of R1 may be expressed as follows:

$$R_1 = \frac{Z_{skin} - Z_{platen}}{Z_{skin} + Z_{platen}} \quad \text{(Equation 1)}$$

In Equation 1, $Z_{skin}$ represents the acoustic impedance of skin and $Z_{platen}$ represents the acoustic impedance of a platen. A typical acoustic impedance of skin is about 1.8 MRayl. A glass platen would typically have an acoustic impedance of about 13.7 MRayl and an aluminum platen would typically have an acoustic impedance of about 16.9 MRayl. Assuming that a reflection from a platen/fingerprint valley interface is a reflection from a platen/air interface, the amplitude of R2 may be expressed as follows:

$$R_2 = \frac{Z_{air} - Z_{platen}}{Z_{air} + Z_{platen}} \quad \text{(Equation 2)}$$

In Equation 2, $Z_{air}$ represents the acoustic impedance of air. A typical acoustic impedance of air is about 0.00043 MRayl.

In view of the foregoing equations and acoustic impedance values, it is clear that a platen/air interface will generally provide a much higher-amplitude reflection (corresponding with R2) than a platen/fingerprint ridge interface (corresponding with R1). Therefore, fingerprint valley features will generally correspond to areas of relatively high-amplitude signals and fingerprint ridge features will generally correspond to areas of relatively low-amplitude signals.

In some implementations, the difference in amplitude between fingerprint valley features and fingerprint ridge features may be used to determine areas for measuring a fingerprint valley time interval or a fingerprint ridge time interval. Accordingly, the difference in amplitude between fingerprint valley features and fingerprint ridge features may be used to facilitate one or more of the spoof detection processes described herein.

Fingerprint valley features may, for example, correspond with continuous or piecewise-continuous areas of relatively high-amplitude signals and fingerprint ridge features may correspond with continuous or piecewise-continuous areas of relatively low-amplitude signals. The continuous or piecewise-continuous areas may correspond to lines have varying degrees of curvature. For example, a relatively straight ridge or valley may have a small curvature and a highly curved ridge or valley, such as those in a fingerprint whorl area, may have a high curvature.

In some examples the fingerprint ridge and valley features may include pattern information and/or fingerprint minutiae such as ridge ending information, ridge bifurcation information, short ridge information, ridge flow information, island information, spur information, delta information, core information, etc. Accordingly, in some instances the fingerprint features may be suitable for performing an authentication process. In some implementations, a control system (such as the control system 106 of FIG. 1) may be capable of initiating an authentication process that is based, at least in part, on the fingerprint features. In some implementations, the control system may be capable of performing an authentication process that is based, at least in part, on the fingerprint features.

Figure 12:
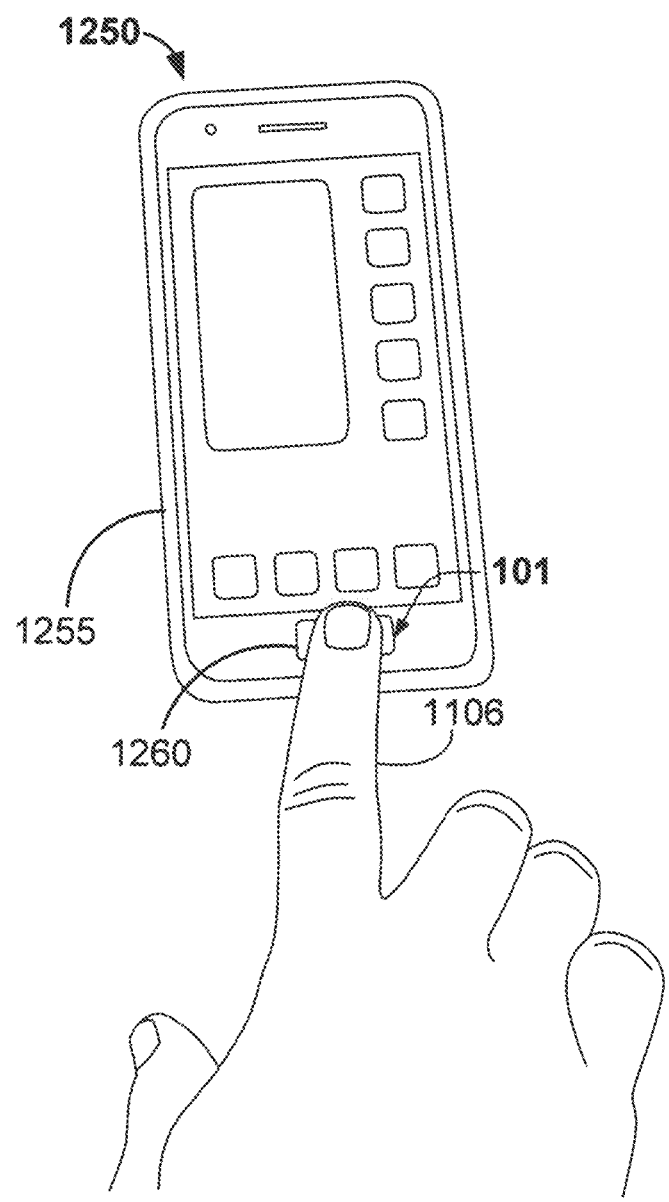
FIG. 12 shows an example of a mobile device that includes a biometric system as disclosed herein.

FIG. 12 shows an example of a mobile device that includes a biometric system as disclosed herein. In this example, the mobile device 1250 is a smartphone. However, in alternative examples the mobile device 1250 may another type of mobile device, such as a mobile health device, such as a mobile drug delivery device, a wearable device, a tablet computer, etc.

In this example, the mobile device 1250 includes an instance of the apparatus 101 that is described above with reference to FIG. 1. In some implementations, the apparatus 101 may be capable of performing at least some of the spoof detection processes disclosed herein, including but not limited to the spoof detection processes that are described above with reference to FIGS. 1 and 2.

In this example, the apparatus 101 is disposed, at least in part, within the mobile device enclosure 1255. According to this example, at least a portion of the apparatus 101 is located in the portion of the mobile device 1250 that is shown being touched by the finger 1106, which corresponds to the location of button 1260. Accordingly, the button 1260 may be an ultrasonic button. In some implementations, the button 1260 may serve as a home button. In some implementations, the button 1260 may serve as an ultrasonic authenticating button, with the ability to turn on or otherwise wake up the mobile device 1250 when touched or pressed and/or to authenticate or otherwise validate a user when applications running on the mobile device (such as a wake-up function) warrant such a function.

In this implementation, the mobile device 1250 is capable of performing a user authentication process. For example, a control system of the mobile device 1250 may be capable of comparing attribute information obtained from ultrasonic data received via an ultrasonic sensor array of the apparatus 101 with stored attribute information obtained from ultrasonic data that has previously been received from an authorized user. In some examples, the attribute information obtained from the received ultrasonic data and the stored attribute information may include attribute information corresponding to at least one of sub-epidermal features, muscle tissue features or bone tissue features.

According to some implementations, the attribute information obtained from the received ultrasonic data and the stored attribute information may include information regarding fingerprint minutia or keypoints. In some such implementations, the user authentication process may involve evaluating information regarding the fingerprint minutia as well as at least one other type of attribute information, such as attribute information corresponding to sub-epidermal features. According to some such examples, the user authentication process may involve evaluating information regarding the fingerprint minutia or keypoints as well as attribute information corresponding to vascular features. For example, attribute information obtained from a received image of blood vessels in the finger may be compared with a stored image of blood vessels in the authorized user's finger 1106.

Figure 13:
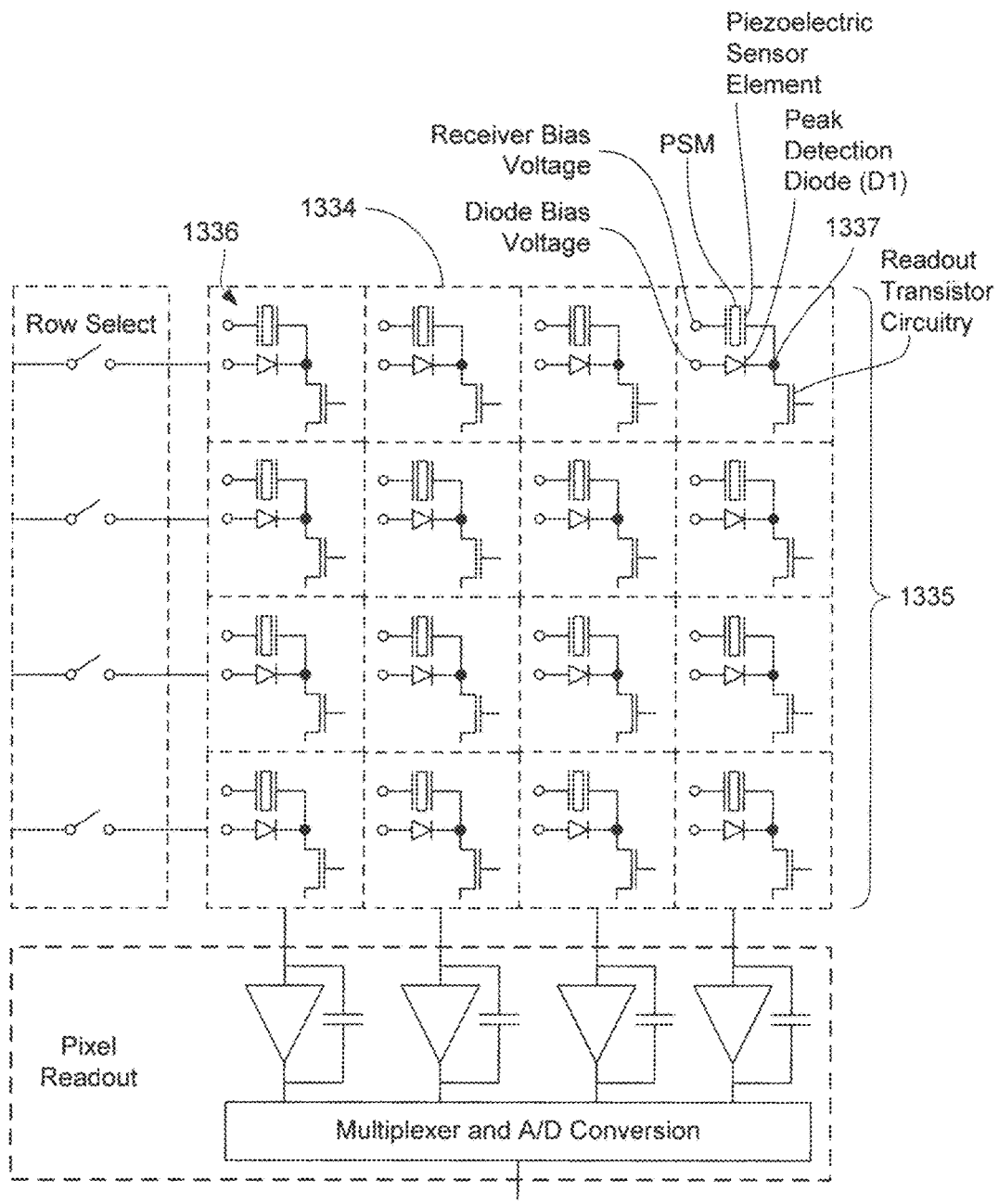
FIG. 13 representationally depicts aspects of a 4×4 pixel array of sensor pixels for an ultrasonic sensor system.

FIG. 13 representationally depicts aspects of a 4×4 pixel array of sensor pixels for an ultrasonic sensor system. Each pixel 1334 may be, for example, associated with a local region of piezoelectric sensor material (PSM), a peak detection diode (D1) and a readout transistor (M3); many or all of these elements may be formed on or in a substrate to form the pixel circuit 1336. In practice, the local region of piezoelectric sensor material of each pixel 1334 may transduce received ultrasonic energy into electrical charges. The peak detection diode D1 may register the maximum amount of charge detected by the local region of piezoelectric sensor material PSM. Each row of the pixel array 1335 may then be scanned, e.g., through a row select mechanism, a gate driver, or a shift register, and the readout transistor M3 for each column may be triggered to allow the magnitude of the peak charge for each pixel 1334 to be read by additional circuitry, e.g., a multiplexer and an A/D converter. The pixel circuit 1336 may include one or more TFTs to allow gating, addressing, and resetting of the pixel 1334.

Each pixel circuit 1336 may provide information about a small portion of the object detected by the ultrasonic sensor system. While, for convenience of illustration, the example shown in FIG. 13 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 14A:
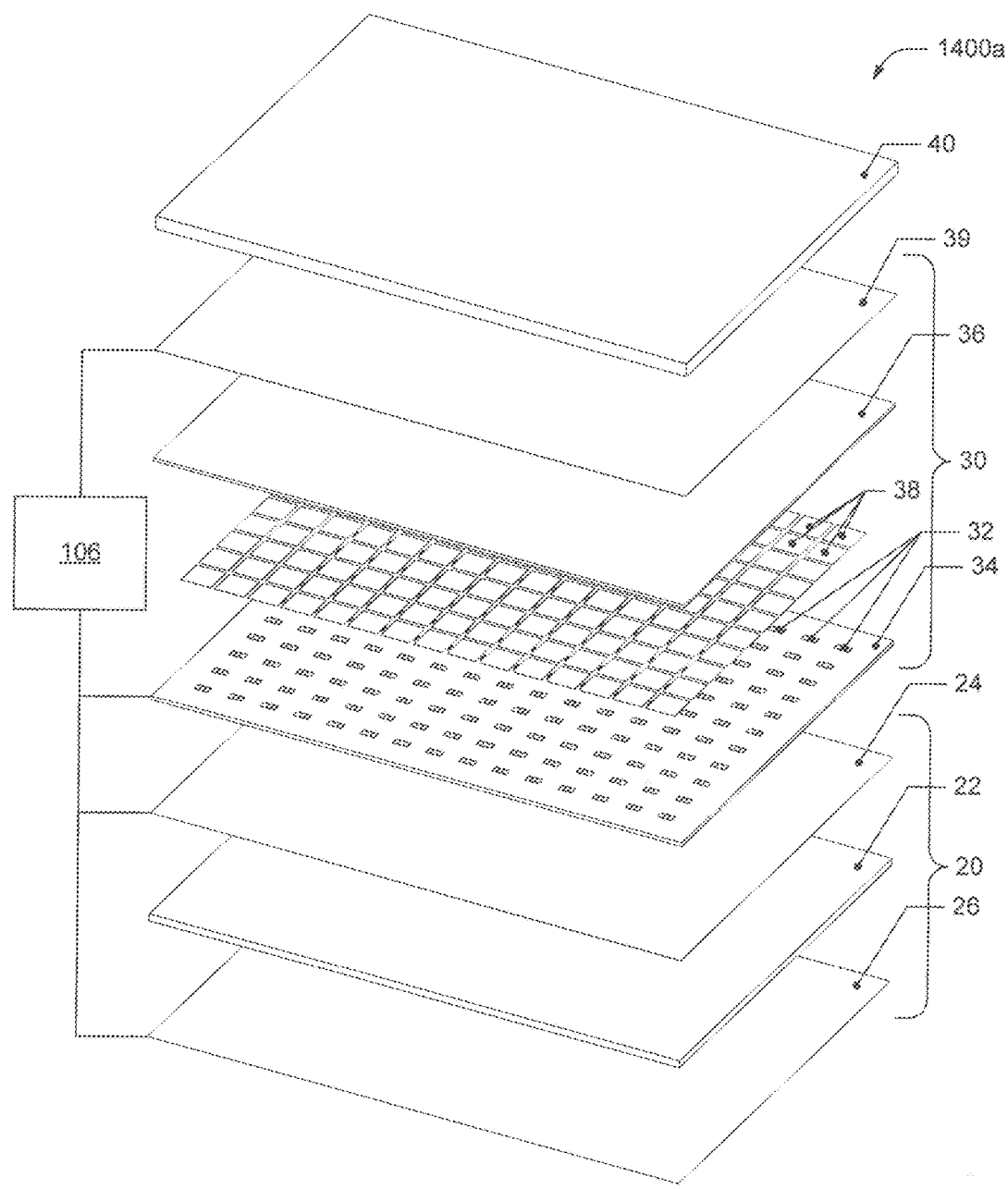
FIG. 14A shows an example of an exploded view of an ultrasonic sensor system.

FIG. 14A shows an example of an exploded view of an ultrasonic sensor system. In this example, the ultrasonic sensor system 1400a includes an ultrasonic transmitter 20 and an ultrasonic receiver 30 under a platen 40. According to some implementations, the ultrasonic receiver 30 may be an example of the ultrasonic receiver array 103 that is shown in FIG. 1 and described above. In some implementations, the ultrasonic transmitter 20 may be an example of the optional ultrasonic transmitter 105 that is shown in FIG. 1 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. in this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other target object), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

In some examples, the control system 106 may be capable of performing one or more of the spoof detection processes disclosed herein. The control system 106 may be capable of controlling the ultrasonic transmitter 20 and/or the ultrasonic receiver 30 to obtain ultrasonic data, e.g., by obtaining fingerprint images. Whether or not the ultrasonic sensor system 1400a includes an ultrasonic transmitter 20, the control system 106 may be capable of obtaining attribute information from the ultrasonic data. The attribute information may correspond to fingerprint features and/or to sub-epidermal features. In some examples, the control system 106 may be capable of performing one or more of the authentication processes disclosed herein. Accordingly, in some examples, the control system 106 may be capable of controlling access to one or more devices based, at least in part, on the attribute information.

The ultrasonic sensor system 1400a (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 1400a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1400a is operating in the force-sensing mode. In some implementations, the control system 106 may be capable of controlling other devices, such as a display system, a communication system, etc. In some implementations, the control system 106 may be capable of operating the ultrasonic sensor system 1400*a* in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 14B:
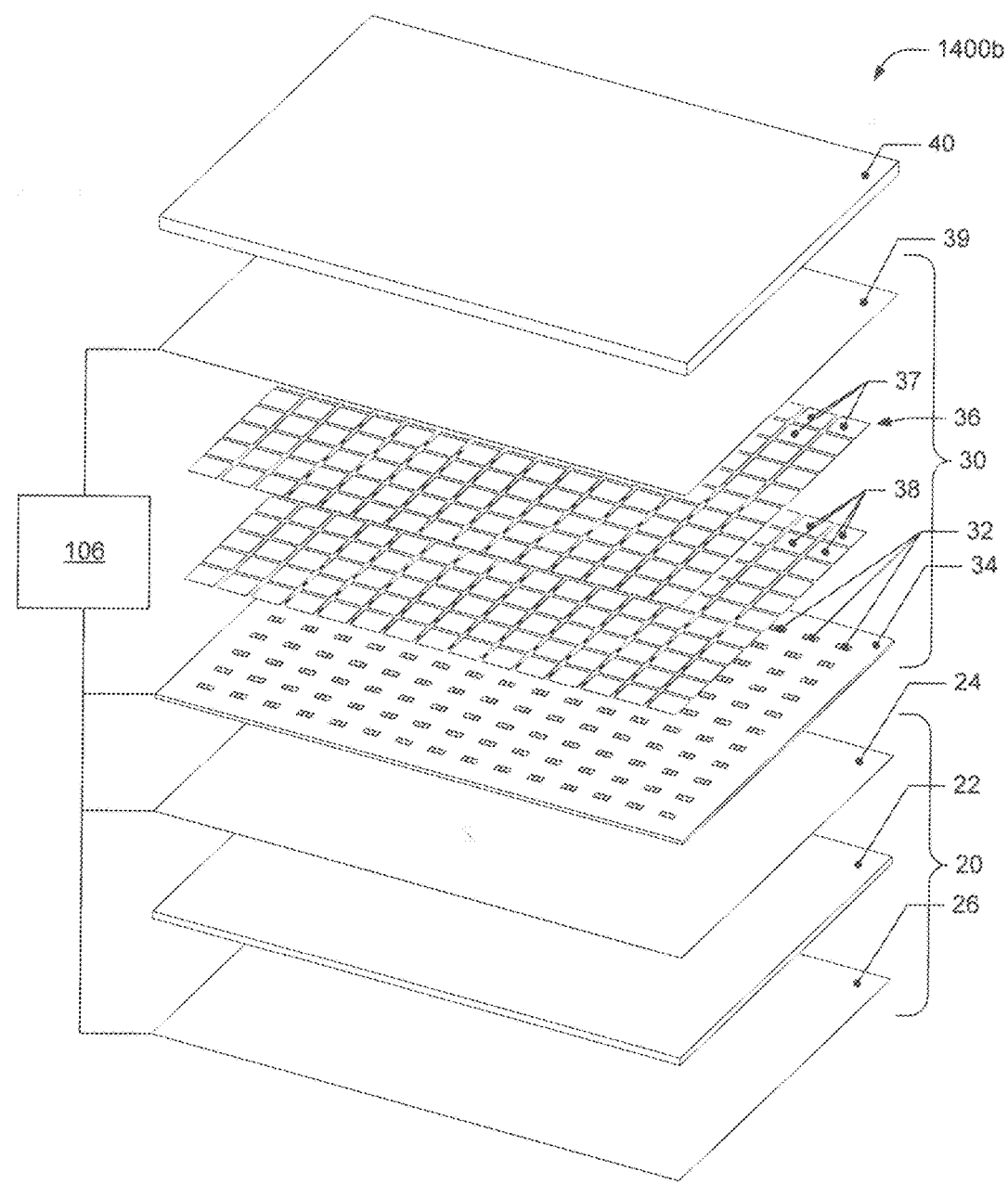
FIG. 14B shows an exploded view of an alternative example of an ultrasonic sensor system.

FIG. 14B shows an exploded view of an alternative example of an ultrasonic sensor system. In this example, the piezoelectric receiver layer 36 has been formed into discrete elements 37. In the implementation shown in FIG. 14B, each of the discrete elements 37 corresponds with a single pixel input electrode 38 and a single sensor pixel circuit 32. However, in alternative implementations of the ultrasonic sensor system 1400*b*, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 14A and 14B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic puke timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an ultrasonic sensor system; and
a control system configured for communication with the ultrasonic sensor system, the control system further configured for:
controlling the ultrasonic sensor system to obtain first ultrasonic data from at least a part of a target object proximate a surface of the apparatus;
receiving the first ultrasonic data from the ultrasonic sensor system;
identifying one or more fingerprint ridge features and one or more fingerprint valley features corresponding to the first ultrasonic data;
determining, based on the first ultrasonic data, one or more fingerprint valley time intervals corresponding to a depth of one or more fingerprint valley features; and
performing a spoof detection process based, at least in part, on the one or more fingerprint valley time intervals.

2. The apparatus of claim 1, wherein the fingerprint valley time intervals are ridge-to-valley time intervals measured from a crest of a fingerprint ridge feature to a trough of an adjacent fingerprint valley feature.

3. The apparatus of claim 1, wherein the control system is further configured for converting the fingerprint valley time intervals to fingerprint valley depths and wherein the spoof detection process involves comparing the fingerprint valley depths with a range of expected fingerprint valley depths.

4. The apparatus of claim 1, wherein controlling the ultrasonic sensor system to obtain the first ultrasonic data involves controlling the ultrasonic sensor system to obtain the first ultrasonic data during a first acquisition time window after a first acquisition time delay.

5. The apparatus of claim 4, wherein the control system is further capable of:
controlling the ultrasonic sensor system to obtain second ultrasonic data from at least the part of the target object during a second acquisition time window after a second acquisition time delay that is longer than the first acquisition time delay;
receiving, from the ultrasonic sensor system, the second ultrasonic data; and
performing the spoof detection process based, at least in part, on the second ultrasonic data.

6. The apparatus of claim 5, wherein the second acquisition time delay corresponds to a depth below a typical ridge-to-valley depth of a fingerprint.

7. The apparatus of claim 4, wherein the control system is further configured for:

controlling the ultrasonic sensor system to obtain second through Nth ultrasonic data during second through Nth acquisition time windows after second through Nth acquisition time delays;

receiving the second through Nth ultrasonic data from the ultrasonic sensor system; and constructing a three-dimensional representation of fingerprint ridges and fingerprint valleys based on the first through Nth ultrasonic data.

8. The apparatus of claim 1, wherein the ultrasonic sensor system includes an ultrasonic receiver array and wherein receiving the first ultrasonic data from the ultrasonic sensor system involves receiving the first ultrasonic data from a single row or column of the ultrasonic receiver array.

9. The apparatus of claim 1, wherein the apparatus comprises a mobile device.

10. The apparatus of claim 9, wherein the mobile device comprises a smart phone.

11. A non-transitory medium having software stored thereon, the software including instructions to control one or more devices for:

controlling an ultrasonic sensor system to obtain first ultrasonic data from at least a part of a target object proximate a surface of an apparatus;

receiving the first ultrasonic data from the ultrasonic sensor system;

identifying one or more fingerprint ridge features and one or more fingerprint valley features corresponding to the first ultrasonic data;

determining, based on the first ultrasonic data, one or more fingerprint valley time intervals corresponding to a depth of one or more fingerprint valley features; and performing a spoof detection process based, at least in part, on the one or more fingerprint valley time intervals.

12. The non-transitory medium of claim 11, wherein the software includes instructions for converting the fingerprint valley time intervals to fingerprint valley depths and wherein the spoof detection process involves comparing the fingerprint valley depths with a range of expected fingerprint valley depths.

13. The non-transitory medium of claim 11, wherein controlling the ultrasonic sensor system to obtain the first ultrasonic data involves controlling the ultrasonic sensor system to obtain the first ultrasonic data during a first acquisition time window after a first acquisition time delay.

14. The non-transitory medium of claim 13, wherein the software includes instructions for:

controlling the ultrasonic sensor system to obtain second ultrasonic data from at least the part of the target object during a second acquisition time window after a second acquisition time delay that is longer than the first acquisition time delay;

receiving, from the ultrasonic sensor system, the second ultrasonic data; and performing the spoof detection process based, at least in part, on the second ultrasonic data.

15. The non-transitory medium of claim 14, wherein the second acquisition time delay corresponds to a depth below a typical ridge-to-valley depth of a fingerprint.

16. The non-transitory medium of claim 13, wherein the software includes instructions for:

controlling the ultrasonic sensor system to obtain second through Nth ultrasonic data during second through Nth acquisition time windows after second through Nth acquisition time delays;

receiving the second through Nth ultrasonic data from the ultrasonic sensor system; and constructing a three-dimensional representation of fingerprint ridges and fingerprint valleys based on the first through Nth ultrasonic data.

17. An apparatus, comprising:

an ultrasonic sensor system; and control means for:

controlling the ultrasonic sensor system to obtain first ultrasonic data from at least a part of a target object proximate a surface of the apparatus;

receiving the first ultrasonic data from the ultrasonic sensor system;

identifying one or more fingerprint ridge features and one or more fingerprint valley features corresponding to the first ultrasonic data;

determining, based on the first ultrasonic data, one or more fingerprint valley time intervals corresponding to a depth of one or more fingerprint valley features; and performing a spoof detection process based, at least in part, on the one or more fingerprint valley time intervals.

18. The apparatus of claim 17, wherein the control means comprises means for converting the fingerprint valley time intervals to fingerprint valley depths and wherein the spoof detection process involves comparing the fingerprint valley depths with a range of expected fingerprint valley depths.

19. The apparatus of claim 17, wherein controlling the ultrasonic sensor system to obtain the first ultrasonic data involves controlling the ultrasonic sensor system to obtain the first ultrasonic data during a first acquisition time window after a first acquisition time delay.

20. The apparatus of claim 19, wherein the control means comprises means for:

controlling the ultrasonic sensor system to obtain second ultrasonic data from at least the part of the target object during a second acquisition time window after a second acquisition time delay that is longer than the first acquisition time delay;

receiving, from the ultrasonic sensor system, the second ultrasonic data; and performing the spoof detection process based, at least in part, on the second ultrasonic data.

\* \* \* \* \*